(12) United States Patent
Bao et al.

(10) Patent No.: US 12,181,645 B2
(45) Date of Patent: Dec. 31, 2024

(54) INFRARED OPTICAL IMAGING LENS, CAMERA MODULE AND DRIVING MONITOR SYSTEM

(71) Applicant: JIANGXI LIANCHUANG ELECTRONIC CO., LTD., Nanchang (CN)

(72) Inventors: Yumin Bao, Nanchang (CN); Xiaobai Hong, Nanchang (CN); Kemin Wang, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 647 days.

(21) Appl. No.: 17/351,202

(22) Filed: Jun. 17, 2021

(65) Prior Publication Data

US 2021/0318525 A1 Oct. 14, 2021

Related U.S. Application Data

(63) Continuation-in-part of application No. PCT/CN2020/108239, filed on Aug. 10, 2020.

(30) Foreign Application Priority Data

Oct. 29, 2019 (CN) .......................... 201911033952.2

(51) Int. Cl.
*G02B 13/18* (2006.01)
*G02B 7/02* (2021.01)
(Continued)

(52) U.S. Cl.
CPC ............... *G02B 13/14* (2013.01); *G02B 7/02* (2013.01); *G02B 9/12* (2013.01); *G02B 13/0035* (2013.01)

(58) Field of Classification Search
CPC ... G02B 9/00; G02B 9/12; G02B 9/16; G02B 9/32; G02B 13/00; G02B 13/001;
(Continued)

(56) References Cited

U.S. PATENT DOCUMENTS 4,838,665 A 6/1989 Hasegawa et al.
7,458,737 B2 * 12/2008 Isono ................. G02B 13/0035
359/791
(Continued)

FOREIGN PATENT DOCUMENTS

CN 1447144 A 10/2003
CN 1936643 A 3/2007
(Continued)

OTHER PUBLICATIONS

SIPO, First Office Action for CN Application No. 201911033952.2, Dec. 12, 2019.
(Continued)

*Primary Examiner* — Thong Q Nguyen

(57) ABSTRACT

Provided are an infrared optical imaging camera lens and an imaging device. The lens includes sequentially along an optical axis, from an object side to an imaging side: a stop, a first lens having positive focal power, a second lens having positive focal power, a third lens having negative focal power, and an optical filter. An object-side surface of the first lens is a convex surface, and an image-side surface of the first lens is a concave surface. An object-side surface of the second lens is a concave surface, and an image-side surface of the second lens is a convex surface. An object-side surface of the third lens is a convex surface in a region near the optical axis, and an image-side surface of the third lens is a concave surface in the region near the optical axis.

18 Claims, 17 Drawing Sheets

(51) Int. Cl.
*G02B 9/12* (2006.01)
*G02B 13/00* (2006.01)
*G02B 13/14* (2006.01)

(58) Field of Classification Search
CPC .............. G02B 13/0015; G02B 13/002; G02B 13/0035; G02B 13/008; G02B 13/14; G02B 13/146; G02B 13/18
USPC ................. 359/355–357, 716, 754, 784, 791
See application file for complete search history.

(56) References Cited

U.S. PATENT DOCUMENTS

| | | | |
|---|---|---|---|
| 8,379,328 B2* | 2/2013 | Iba ..................... | G02B 13/0035 |
| | | | 359/716 |
| 8,558,939 B2* | 10/2013 | Matsui ............... | G02B 13/0035 |
| | | | 359/716 |
| 2005/0264671 A1* | 12/2005 | Isono ................... | H04N 23/54 |
| | | | 348/335 |
| 2008/0266679 A1 | 10/2008 | Junichi | |
| 2017/0104903 A1* | 4/2017 | Warashina ............ | G03B 17/02 |
| 2018/0307000 A1* | 10/2018 | Lai .......................... | G02B 9/04 |
| 2022/0179188 A1* | 6/2022 | Zischke ................. | G02B 13/06 |

FOREIGN PATENT DOCUMENTS

| | | |
|---|---|---|
| CN | 101046541 A | 10/2007 |
| CN | 101846781 A | 9/2010 |
| CN | 103941379 A | 7/2014 |
| CN | 106443940 A | 2/2017 |
| CN | 108107548 A | 6/2018 |
| JP | 2008275831 A | 11/2008 |
| JP | 2014167497 A | 9/2014 |
| JP | 2014219669 A | 11/2014 |
| JP | 2017219655 A | 12/2017 |
| WO | 2013047202 A1 | 4/2013 |

OTHER PUBLICATIONS

SIPO, Notification to Grant Patent Right for Invention for CN Application No. 201911033952.2, Jan. 22, 2020.

WIPO, Written opinion of the International Search Authority for PCT Application No. PCT/CN2020/108239, Nov. 4, 2020.

WIPO, International Search Report for PCT Application No. PCT/CN2020/108239, Nov. 4, 2020.

* cited by examiner

INFRARED OPTICAL IMAGING LENS, CAMERA MODULE AND DRIVING MONITOR SYSTEM

CROSS REFERENCE TO RELATED APPLICATIONS

This application is a continuation-in-part of an International Application No. PCT/CN2020/108239 filed on Aug. 10, 2020. The international Application claims priority to a Chinese application No. 201911033952.2 filed on Oct. 29, 2019. The entirety of the above-mentioned applications is hereby incorporated by reference herein.

TECHNICAL FIELD

The disclosure relates to the field of lens imaging technologies, and more particularly, to an infrared optical imaging lens, an imaging device, a camera module and a driver monitor system.

BACKGROUND

According to industry-related data, 80% of road safety accidents are directly or indirectly caused by dangerous driving of drivers, so that if the driving behaviors of the drivers could be detected and reminded in time, the probability of traffic accidents would be effectively reduced.

A Driver Monitor System (DMS) uses images captured by a DMS camera to detect the driver's driving behavior and physiological state through visual tracking, target detection, motion recognition and other technologies. When the driver is fatigued, distracted, calling, smoking, not wearing a seat belt or in other dangerous situations, the system will alarm within the set time to avoid accidents. The DMS can effectively regulate the driver's driving behavior, reduce accidents caused by human error, and escort driving safety.

On one hand, when the driving behavior and the facial information of the driver are detected by the DMS camera, it is necessary to select an appropriate light source. In order to reduce the influence of ambient light on imaging, the intensity of the active light source may need to be higher than that of the ambient light, but strong light can interfere with human eyes and reduces user's comfort. Therefore, the wavelength of the active light source is preferably in an invisible band, such as infrared light band, ultraviolet light band and so on. Long-term exposure to ultraviolet light is likely to cause permanent damage to human skin and eyes. The mid and far infrared band light imaging will lose most of the information on the surface of an object, which is generally not used for object imaging. Therefore, the near-infrared band light becomes the best choice of DMS. That is, the camera used in the DMS needs to have good imaging capabilities in the near-infrared band.

On the other hand, as the miniaturization of the optoelectronic element, the reflow process is widely applied to the DMS, to bond the optoelectronic element and the circuit board, and the reflow process requires that the optoelectronic element is subjected to a high temperature at least 230° C. or higher, which requires that the camera applied to the DMS still can clearly imaging, after being baked at a high temperature of 230° C. or higher, so as to meet the requirement.

However, an optical lens meeting such a requirement, generally adopts an all-glass spherical lens, but the volume of the all-glass spherical lens is increased, and the volume of the lens can be reduced by adopts a plastic lens, but due to the characteristics of the plastic material, when the ambient temperature is above 130° C., the plastic lens is softened and deformed, so that the plastic lens is prone to fail after a high-temperature reflow process of at least 230° C.

SUMMARY

The object of the disclosure is to provide an infrared optical imaging lens and an imaging device, each having the advantages of miniaturization, high-temperature resistance and high imaging quality.

The object is realized through the following technical solutions.

In a first aspect, the disclosure provides an infrared optical imaging lens. From an object side to an imaging plane along an optical axis of the infrared optical imaging lens, the infrared optical imaging lens sequentially includes a stop, a first lens with a positive focal power, a second lens with a positive focal power, a third lens with a negative focal power, and a filter. An object side surface of the first lens is convex, an image side surface of the first lens is concave. An object side surface of the second lens is concave, an image side surface of the second lens is convex. A paraxial region of an object side surface of the third lens is convex, and a paraxial region of an image side surface of the third lens is concave. The first lens is a glass lens, the second lens and the third lens are both glass aspherical lenses. The optical centers of the first lens, the second lens and the third lens are positioned in a same line. The infrared optical imaging lens meets the expressions: 3.0 mm<f<4.0 mm, $-3.0 \times 10^{-6}/°C. \leq (dn/dt)2 \leq -0.2 \times 10^{-6}/°C.$ and $3.9 \times 10^{-6}/°C. \leq (dn/dt)2 < 8.5 \times 10^{-6}/°C.$, $3.9 \times 10^{-6}/°C. \leq (dn/dt)3 < 8.5 \times 10^{-6}/°C.$, where f represents a focal length of the infrared optical imaging lens, (dn/dt)2 represents a temperature coefficient of the refractive index of the second lens, and (dn/dt)3 represents a temperature coefficient of the refractive index of the third lens.

In a second aspect, the disclosure provides an imaging device. The image device includes an imaging element and the infrared optical imaging lens provided in the first aspect. The imaging element is configured to convert an optical image formed by the infrared optical imaging lens into electrical signals.

In a third aspect, the disclosure provides a camera module. The camera module includes a barrel, a holder, an image sensor, a printed circuit board, and the infrared optical imaging lens as stated above. The infrared optical imaging lens is mounted in the barrel, the image sensor is mounted in the holder, and the barrel is movable mounted on the holder. The infrared optical imaging lens is configured to form an optical image. The image sensor is opposite to the infrared optical imaging lens and is configured to generate image data for the optical image sensed thereby.

In a fourth aspect, the disclosure provides a DMS. The DMS includes a memory, a processor, and the camera module as described above. The memory and the camera module are both electrically connected with the processor. The camera module is configured to capture images, the processor is configured to acquire and process image data of the captured images, the memory is configured to store the image data of the captured images.

Compared with the related art, the stop of the disclosure is configured to limit the aperture of the infrared optical imaging lens. The stop is arranged before the first lens, it makes the position of entrance pupil move forward, thereby eliminating the influence of the stop on the distortion. The first lens is mainly used for light collection, the second lens is mainly used to correct the field curvature and the astigmatism. The third lens is mainly used to correct aberrations such as the astigmatism and the distortion, as well as to realize the control of the light exit angle. The using of glass aspheric lenses can effectively correct the spherical aberration, reduce the total optical length, reduce the size of the infrared optical imaging lens, and realize the miniaturization of the infrared optical imaging lens. By utilizing special glass material, the first lens, the second lens and the third lens are ensured to be prevented from being softened or deformed under 450° C., so, the sensitivity of the infrared optical imaging lens to temperature can be effectively reduced, and the system performance of the infrared optical imaging lens before and after a reflow process with the highest ambient temperature about 230~260° C. can be maintained to be stable and consistent, thereby improving the stability of the resolution of the infrared optical imaging lens at different temperatures. Meanwhile, the second lens and the third lens adopt a special glass material which meets the expressions of $-3.0\times10^{-6}/° C.\leq(dn/dt)2\leq-0.2\times10^{-6}/° C.$ and $3.9\times10^{-6}/° C.\leq(dn/dt)2<8.5\times10^{-6}/° C.$, $3.9\times10^{-6}/° C.\leq(dn/dt)3<8.5\times10^{-6}/° C.$, which ensures that the infrared optical imaging lens has a good imaging ability in the infrared band.

The infrared optical imaging lens adopts a design of three glass lenses. Through reasonably matching of the glass aspheric lenses and the glass spherical lens and reasonably cooperation of the focal powers, not only the miniaturization of the infrared optical imaging lens can be realized, but the infrared optical imaging lens can still clearly image after being baked at a high temperature more than 230° C. Moreover, the infrared optical imaging lens can be clearly imaged in the wavelength of 800 nm~1100 nm (near infrared region), that is, it has good imaging quality under near infrared light conditions and can satisfy infrared imaging characteristics and high imaging quality requirements of the DMS.

These or other aspects of the disclosure will be more apparent and understandable in the descript ion of the following embodiments.

Figure 1:
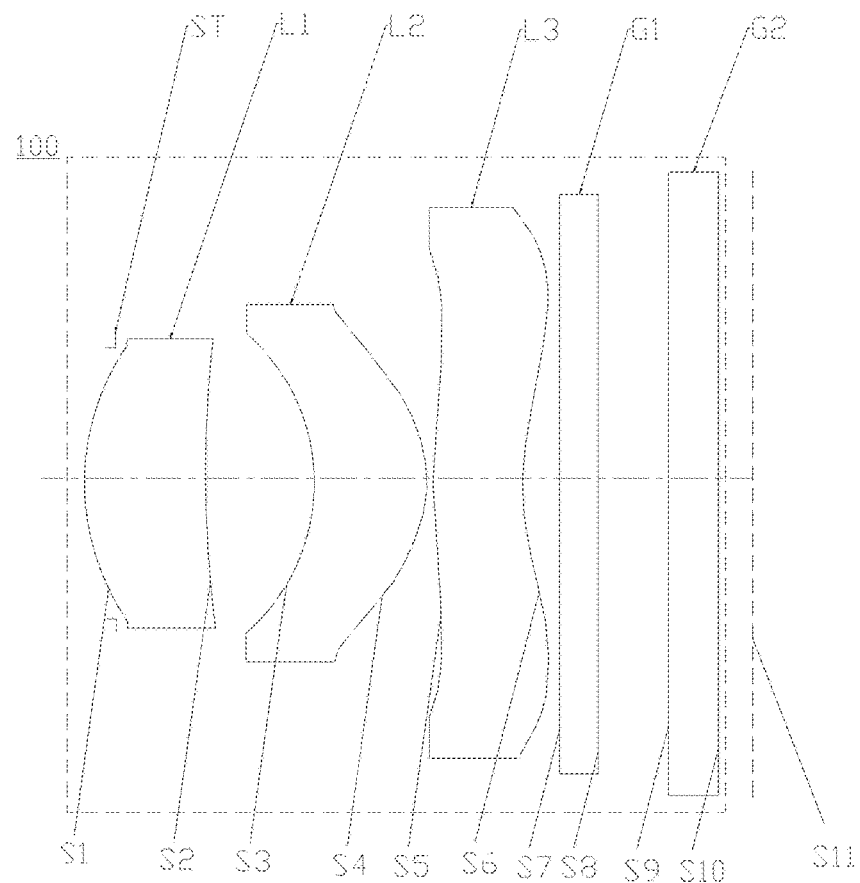
FIG. 1 is a schematic structural diagram of an infrared optical imaging lens according to a first embodiment of the disclosure.
Figure 2:
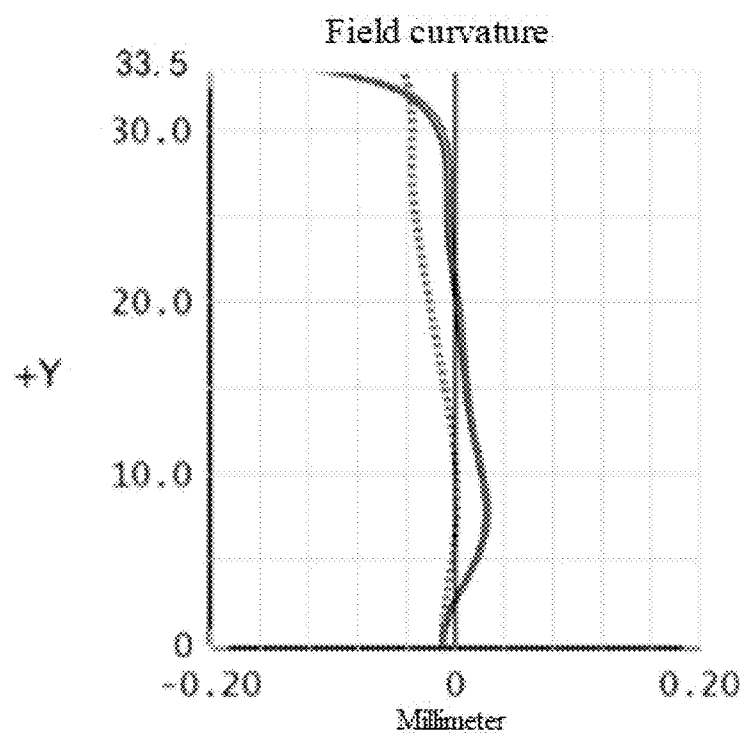
FIG. 2 is a diagram showing field curvature curves of the infrared optical imaging lens according to the first embodiment of the disclosure.
Figure 3:
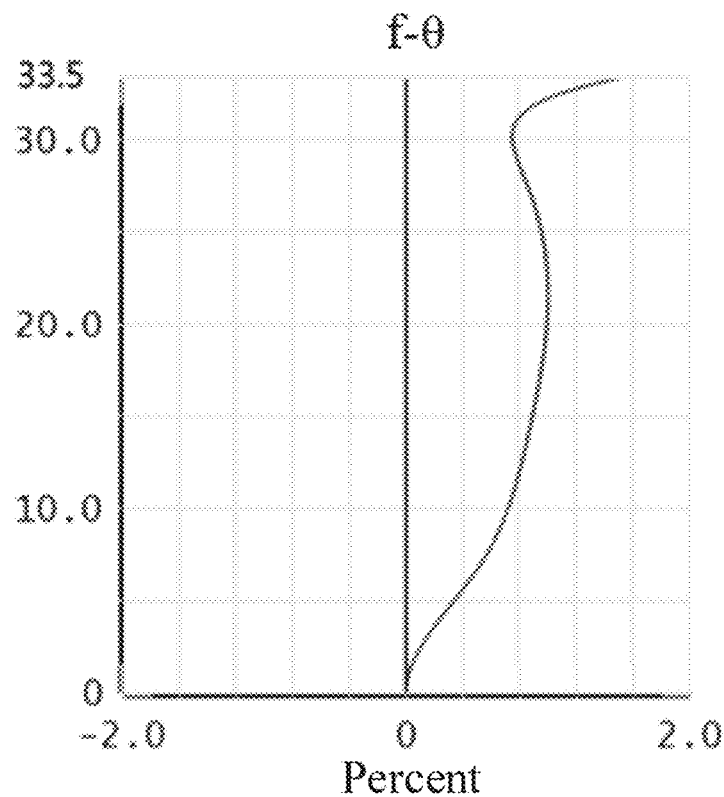
FIG. 3 is a diagram showing f-theta(θ) distortion curves of the infrared optical imaging lens according to the first embodiment of the disclosure.
Figure 4:
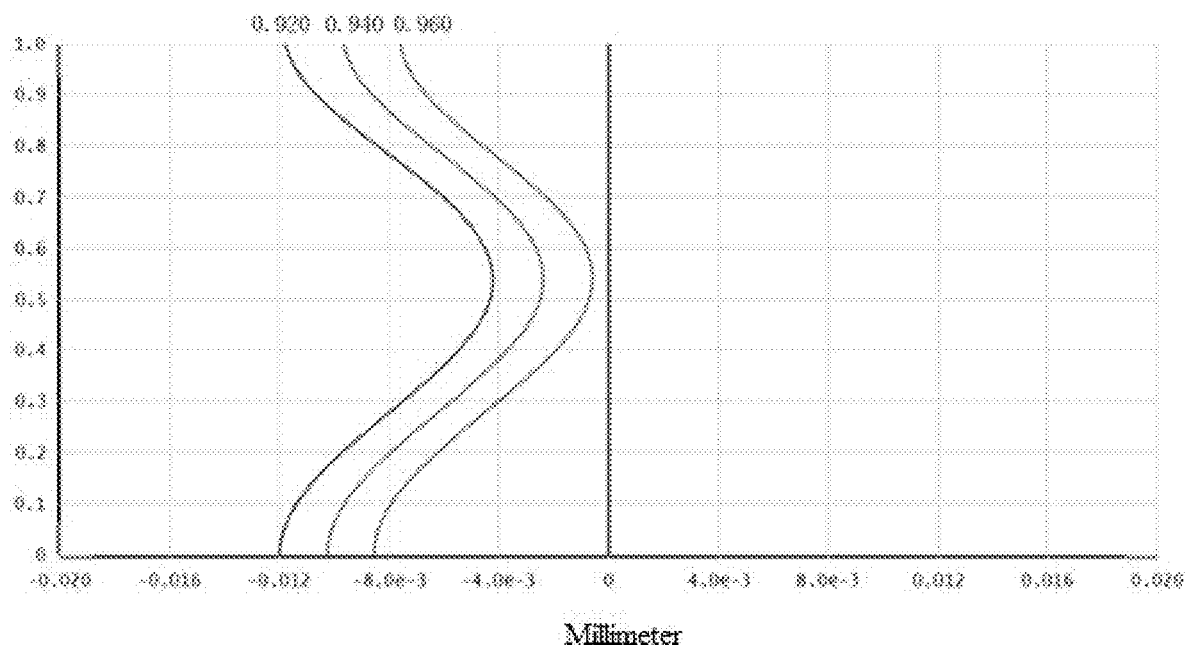
FIG. 4 is a diagram showing longitudinal aberration curves of the infrared optical imaging lens according to the first embodiment of the disclosure.
Figure 5:
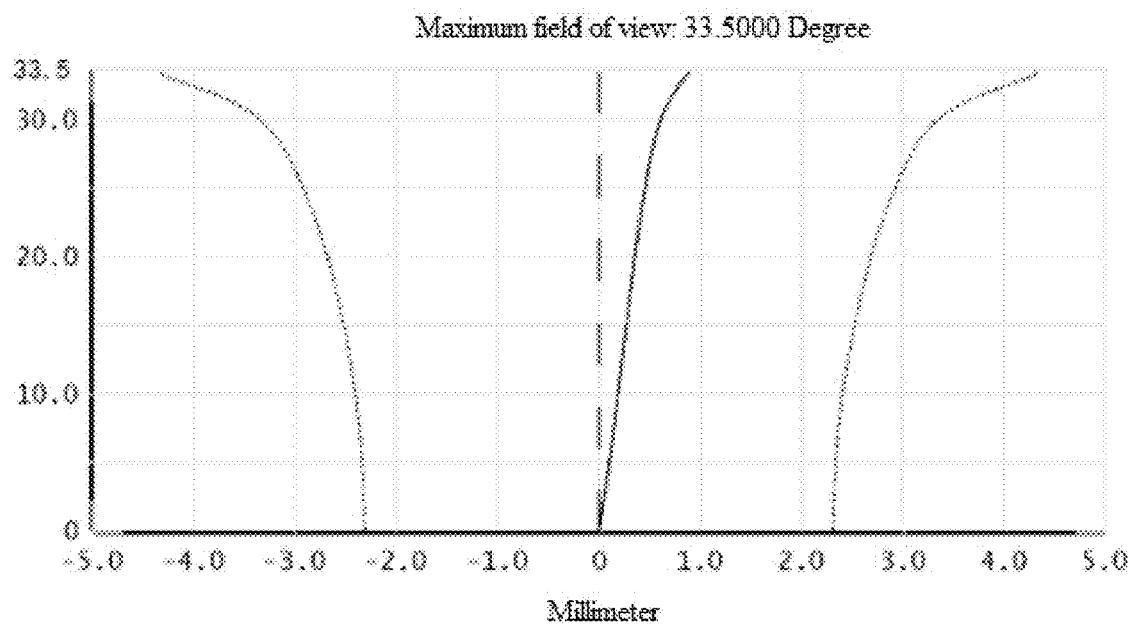
FIG. 5 is a diagram showing lateral chromatic aberration curves of the infrared optical imaging lens according to the first embodiment of the disclosure.

| Main Reference numerals: | | | |
|---|---|---|---|
| Infrared optical imaging lens | 100, 200, 300, 400, 500, 600 | | |
| First lens | L1 | Second lens | L2 |
| Third lens | L3 | Stop | ST |
| Filter | G1 | Flat glass | G2 |
| Object side surface of the first lens | S1 | Image side surface of the first lens | S2 |
| Object side surface of the second lens | S3 | Image side surface of the second lens | S4 |
| Object side surface of the third lens | S5 | The image side surface of the third lens | S6 |
| Object side surface of the filter | S7 | image side surface of the filter | S8 |
| Object side surface of the flat glass | S9 | Image side surface of the flat glass | S10 |
| Imaging plane | S11 | | |
| Imaging device | 700 | Imaging element | 710 |
| Camera module | 800 | Barrel | 801 |
| Holder | 802 | Image sensor | 803 |
| Printed circuit board | 804 | DMS | 900 |
| Memory | 901 | Processor | 902 |
| Car | 1000 | | |

The following embodiments will further illustrate the present disclosure with reference to the above drawings.

DETAILED DESCRIPTION OF PREFERRED EMBODIMENTS

In order to facilitate a better understanding of the present disclosure, the present disclosure will be further explained below with reference to the accompanying drawings. The embodiments of the present disclosure are shown in the drawings, but the prevent disclosure is not limited to the above-mentioned preferred embodiments. In the contrary, these embodiments are provided to make the disclosure more sufficient.

Unless defined otherwise, all technical and scientific terms used herein have the same meaning as commonly understood by one of ordinary skilled in the art of the disclosure. The terminology used herein in the description of the disclosure is only for the purpose of describing specific embodiments, and is not intended to limit the disclosure. The term "and/or" as used herein includes any and all combinations of one listed item or several related listed items.

The disclosure provides an infrared optical imaging lens. From an object side to an imaging plane along an optical axis of the infrared optical imaging lens, the infrared optical imaging lens sequentially includes a stop, a first lens, a second lens, a third lens and a filter. The first lens is a glass lens with a positive focal power, an object side surface of the first lens is convex, and an image side surface of the first lens is concave. The second lens is a glass aspherical lens with a positive focal power, an object side surface of the second lens is concave, and an image side surface or the second lens is convex. The third lens is a glass aspherical lens with a negative focal power, a paraxial region of an object side surface of the third lens is convex, and a paraxial region of an image side surface of the third lens is concave. The optical centers of the first lens, the second lens and third lens are positioned in a same line. The infrared optical imaging lens meets the expressions: $3.0 \text{ mm} < f < 4.0 \text{ mm}$, $-3.0 \times 10^{-6}/°\text{C}. \leq (dn/dt)2 \leq -0.2 \times 10^{-6}/°\text{C}.$ and $3.9 \times 10^{-6}/°\text{C}. \leq (dn/dt)2 < 8.5 \times 10^{-6}/°\text{C}.$, $3.9 \times 10^{-6}/°\text{C}. \leq (dn/dt)3 < 8.5 \times 10^{-6}/°\text{C}.$, where f represents a focal length of the infrared optical imaging lens, $(dn/dt)2$ represents a temperature coefficient of the refractive index of the second lens, and $(dn/dt)3$ represents a temperature coefficient of the refractive index of the third lens. The temperature coefficient of the refractive index of at least one of the second lens and the third lens is not zero.

The stop is configured to limit a diameter of the aperture. The stop is arranged before the first lens in the disclosure, it makes the position of entrance pupil move forward thereby eliminating the influence of the stop on the distortion. The first lens is mainly used for light collection, the second lens is mainly used to correct the field curvature and the astigmatism, and the third lens is mainly used to correct aberrations such as the astigmatism and the distortion, as well as to realize the control of the light exit angle. The use of the glass aspheric lenses can effectively correct the spherical aberration, reduce the total optical length, reduce the volume of the lens, and realize the miniaturization of the lens. Adopting the special glass material can ensure that the lens does not being softened and deformed below 450° C., which can effectively reduce the sensitivity of the lens to the temperature. The stability of the system performance of the lens before and after reflow process are the same, the highest ambient temperature about 230-260° C., so that can promote the stability of the resolution of the lens at different temperatures. Meanwhile, the second lens and the third lens adopt a special glass material, which meets the expressions: $-3.0 \times 10^{-6}/°\text{C}. \leq (dn/dt)2 \leq -0.2 \times 10^{-6}/°\text{C}.$ and $3.9 \times 10^{-6}/°\text{C}. \leq (dn/dt)2 < 8.5 \times 10^{-6}/°\text{C}.$, $3.9 \times 10^{-6}/°\text{C}. \leq (dn/dt)3 < 8.5 \times 10^{-6}/°\text{C}.$, so that can ensure that the lens have a good imaging ability in the infrared band.

In some embodiments, the infrared optical imaging lens meets the expression:

$$0.95 < IH/(f * \tan \theta) < 1.05; \quad (1)$$

where IH represents a half image height of the infrared optical imaging lens, f represents a focal length of the infrared optical imaging lens, and θ represents a half field of view (FOV) of the infrared optical imaging lens. The expression (1) reflects the ratio of the actual image height to the ideal image height.

In some embodiments, the infrared optical imaging lens meets the expression:

$$0.7 < \varphi_1/\varphi < 0.95; \quad (2)$$

where $\varphi_1$ represents a focal power of the first lens, $\varphi$ represents a focal power of the infrared optical imaging lens. The ratio of the focal power of the first lens to the focal power of the infrared optical imaging lens, is defined within the range of the expression (2), which can effectively correct the astigmatism of the infrared optical imaging lens and improve the resolution of the infrared optical imaging lens.

In some embodiments, the infrared optical imaging lens meets the expression:

$$\varphi * T_L < 1.6; \quad (3)$$

where $\varphi$ represents a focal power of the infrared optical imaging lens, $T_L$ represents a total optical length of the infrared optical imaging lens. The focal power of the infrared optical imaging lens and the total optical length of the infrared optical imaging lens, is defined in the range of the expression (3), which can effectively reduce the volume of the infrared optical imaging lens and realize the miniaturization of the infrared optical imaging lens.

In some embodiments, the infrared optical imaging lens meets the expression:

$$-2 < \varphi_2/\varphi_3 < -1.1; \quad (4)$$

where $\varphi_2$ represents a focal power of the second lens, $\varphi_3$ represents a focal power of the third lens. The ratio of the focal power of the second lens to the focal power of the third lens, is defined within the range of the expression (4), which can effectively correct the field curvature of the infrared optical imaging lens and improve the resolution of the infrared optical imaging lens.

In some embodiments, the infrared optical imaging lens meets the expression:

$$0.3 < R1/T_L < 0.46; \quad (5)$$

where R1 represents a radius of curvature of the object side surface of the first lens, $T_L$ represents the total optical length of the infrared optical imaging lens. The ratio of the radius of curvature of the object side surface of the first lens to the total optical length of the infrared optical imaging lens, is defined within the range of the expression (5), which can effectively improve the machinability of the first lens and facilitate the assembly of the first lens.

In some embodiments, the infrared optical imaging lens meets the expression:

$$0.1 < (CT2+ET3)-(ET2+CT3) < 0.4; \quad (6)$$

where CT2 represents a center thickness of the second lens, ET2 represents an edge thickness of the second lens, CT3 represents a center thickness of the third lens, ET3 represents an edge thickness of the third lens. Meeting the expression (6) can reasonably configure the optical path of the central field and the off-axis field between the second lens and the third lens, thereby effectively improving the astigmatism and the field curvature of the infrared optical imaging lens.

In some embodiments, the infrared optical imaging lens meets the expressions:

$$-2.4 < R3/CT2 < -1.5,$$

$$-1.6 < R4/CT2 < -1;$$

where R3 represents a radius of curvature of the object side surface of the second lens, R4 represents a radius of curvature of the image side surface of the second lens, CT2 represents the center thickness of the second lens. When the expressions (7) and (8) are satisfied, the light beam of the off-axis field can be better focused on the imaging plane, which not only facilitates to correct the aberration, but also can meet the requirements of the image height.

In some embodiments, the applicable spectral range of the infrared optical imaging lens is 800 nm to 1100 nm. Conventional lenses are designed to be applicable at the wavelength range of 435 nm~656 nm (visible light), and have poor resolution at the wavelength range of the infrared light. However, the infrared optical imaging lens provided by the disclosure can clearly image in the wavelength of 800 nm~1100 nm (near infrared region), has good imaging quality under near-infrared light conditions, and can meet the imaging requirements of infrared imaging in the DMS.

In some embodiments, the disclosure further provides an imaging device. The imaging device includes the infrared optical imaging lens as mentioned in any above embodiments and an imaging element, and the imaging element is configured to convert an optical image formed by the infrared optical imaging lens into electrical signals.

The shapes of aspheric surfaces of lenses provided by the embodiments of the present disclosure satisfy the following equation:

$$z = \frac{ch^2}{1 + \sqrt{1 - (1+K)c^2h^2}} + Bh^4 + Ch^6 + Dh^8 + Eh^{10} + Fh^{12},$$

where z represents a vector height between a position on the surface and a vertex of the surface along an optical axis of the lens, c represents a curvature of the vertex of the surface, K is a quadratic surface coefficient, h is a distance between the position on the surface and the optical axis, B is a fourth order surface coefficient, C is a sixth order surface coefficient, D is an eighth order surface coefficient, E is a tenth order surface coefficient, F is a twelfth order surface coefficient.

In each of the following embodiments, the thickness, the radius of curvature, and the material of each lens in the infrared optical imaging lens are different. Details can be referred to parameter tables provided in the following embodiments.

Embodiment 1

FIG. 1 illustrates an infrared optical imaging lens 100 including three lenses, according to a first embodiment of the disclosure. From an object side to an imaging plane, the infrared optical imaging lens 100 sequentially includes a stop ST, a first lens L1, a second lens L2, a third lens L3, a filter G1, and a flat glass G2.

The first lens L1 is a glass spherical lens with a positive focal power, an object side surface S1 of the first lens is a convex surface, and an image side surface S2 of the first lens is a concave surface.

The second lens L2 is a glass aspherical lens with a positive focal power, an object side surface S3 of the second lens L2 is a concave surface, and an image side surface S4 of the second lens L2 is a convex surface.

The third lens L3 is a glass aspherical lens with a negative focal power, a paraxial region of the object side surface S3 of the third lens L3 is convex, and a paraxial region of the image side surface S6 of the third lens L3 is concave.

Relevant parameters of every lens included in the infrared optical imaging lens 100 are shown in Table 1.

TABLE 1

| Surface No. | | Radius of curvature (mm) | Thickness (mm) | Refractive index | Abbe number |
|---|---|---|---|---|---|
| | Object side | Infinity | — | | |
| | Stop ST | Infinity | −0.08 | | |
| S1 | First lens L1 | 1.844 | 1.00 | 1.52 | 64.2 |
| S2 | | 12.751 | 0.85 | | |
| S3 | Second lens L2 | −1.479 | 0.93 | 1.62 | 63.9 |
| S4 | | −1.003 | 0.06 | | |
| S5 | Third lens L3 | 4.209 | 0.726 | 1.81 | 40.9 |
| S6 | | 1.595 | 0.30 | | |
| S7 | Filter G1 | Infinity | 0.30 | 1.52 | 64.2 |
| S8 | | Infinity | 0.58 | | |
| S9 | Flat glass G2 | Infinity | 0.40 | 1.52 | 64.2 |
| S10 | | Infinity | 0.125 | | |
| S11 | Imaging surface | Infinity | — | | |

In this embodiment, aspherical parameters of even lens included in the infrared optical imaging lens 100 are shown in Table 2.

TABLE 2

| Surface No. | K | B | C | D | E | F |
|---|---|---|---|---|---|---|
| S3 | 0.302 | −0.025 | 2.413e−3 | −0.067 | 0.130 | −0.037 |
| S4 | −3.369 | −0.183 | 0.110 | −0.062 | 0.022 | −1.669e−5 |
| S5 | −14.484 | −0.055 | 0.017 | −1.567e−3 | 1.395e−3 | 2.954e−4 |
| S6 | −9.291 | −0.052 | 0.015 | −4.022e−3 | 4.277e−4 | −1.258e−5 |

In this embodiment, the curves of the field curvature, the distortion, the longitudinal aberration and the lateral chromatic aberration are shown in FIG. 2, FIG. 3, FIG. 4, and FIG. 5 respectively. It can be seen from FIG. 2 that, the field curvature of the infrared optical imaging lens 100 provided in this embodiment does not exceed 0.12 mm, and the difference between field curvatures respectively in the meridian direction and the sagittal direction at the same wavelength does not exceed 0.08 mm. This indicates the field curvature is well corrected. It can be seen from FIG. 3 that, the absolute value of the distortion of the infrared optical imaging lens 100 provided in this embodiment is less than 2% in the full field. It indicates that the distortion is well corrected, so that captured images have too slight distortion to be corrected in digital. It can be seen from FIG. 4 that, the longitudinal chromatic aberration of the infrared optical imaging lens 100 provided by this embodiment is within ±0.12 mm in the full field. It can be seen from FIG. 5 that the lateral chromatic aberration of the infrared optical imaging lens 100 provided in this embodiment in the wavelength range from 920 to 960 nm is less than 1.0 μm in the full field, and the difference of lateral chromatic aberrations between different wavelengths is very small. This indicates the chromatic aberration of the infrared optical imaging lens 100 at the near-infrared wavelength band is well corrected.

Embodiment 2

Figure 6:
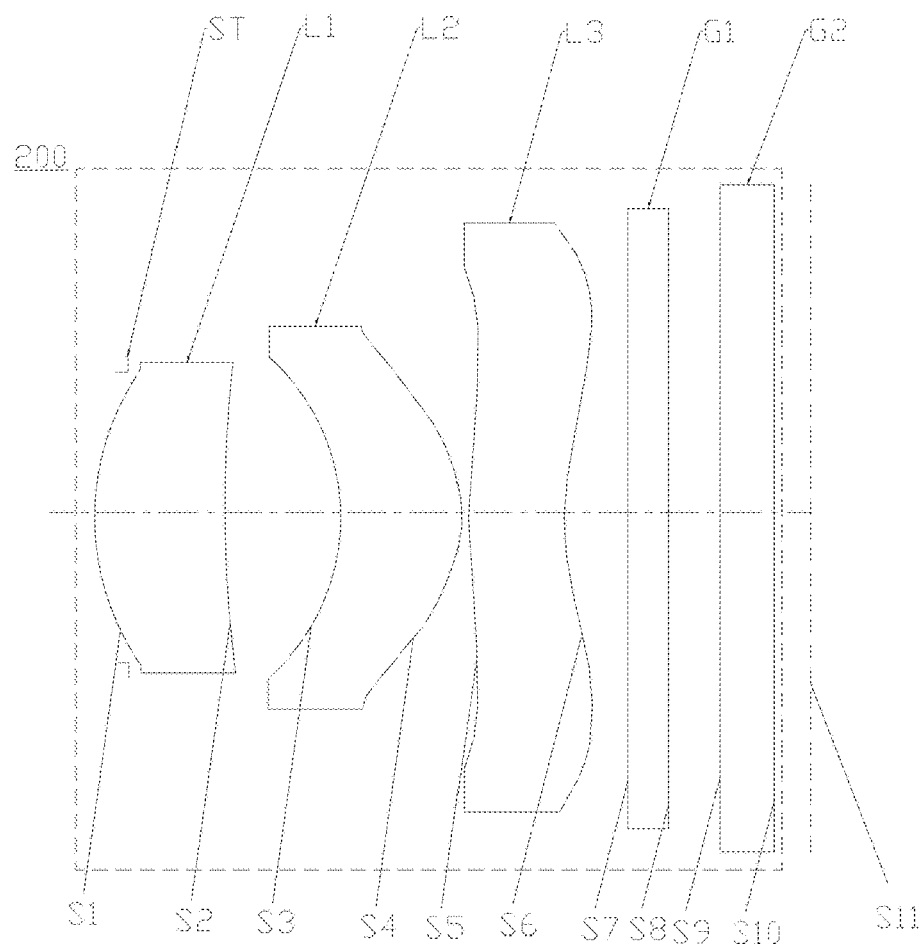
FIG. 6 is a schematic structural diagram of an infrared optical imaging lens according to a second embodiment of the disclosure.
Figure 7:
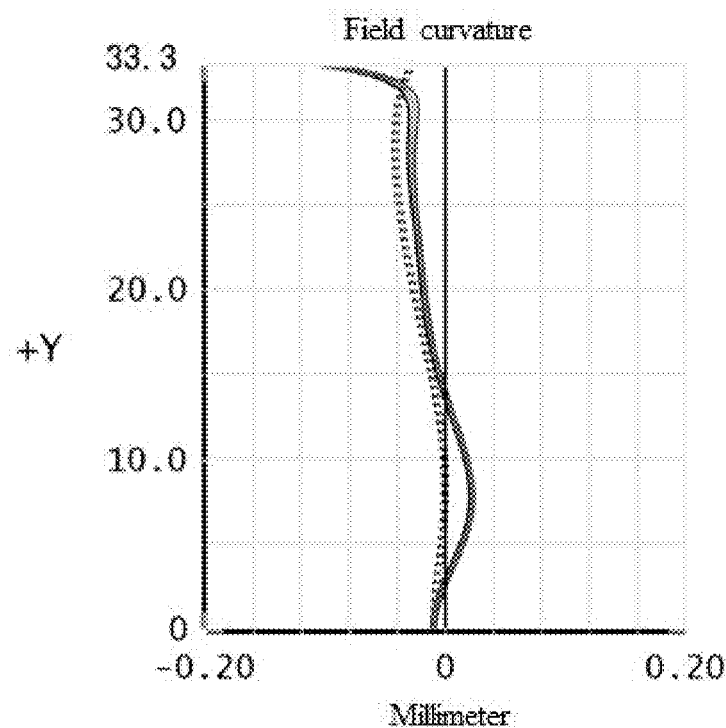
FIG. 7 is a diagram showing field curvature curves of the infrared optical imaging lens according to the second embodiment of the disclosure.
Figure 8:
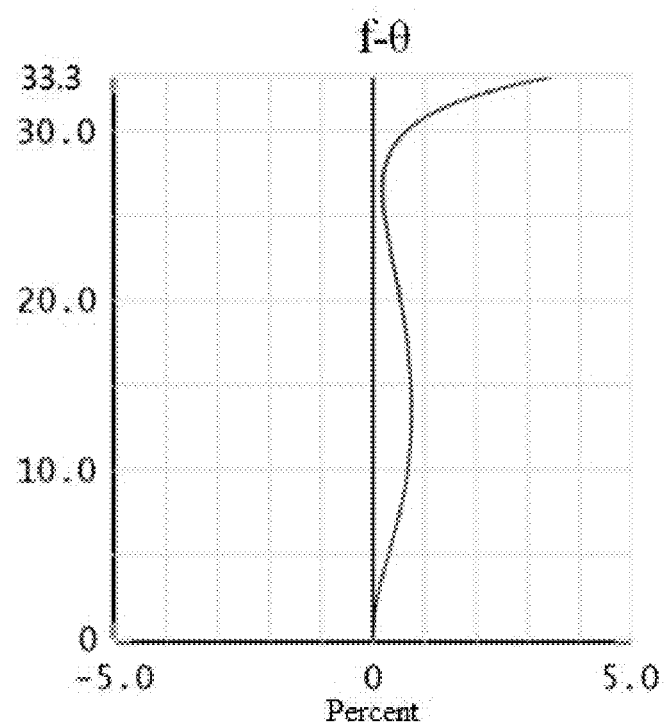
FIG. 8 is a diagram showing f-theta(θ) distortion curves of the infrared optical imaging lens according to the second embodiment of the disclosure.
Figure 9:
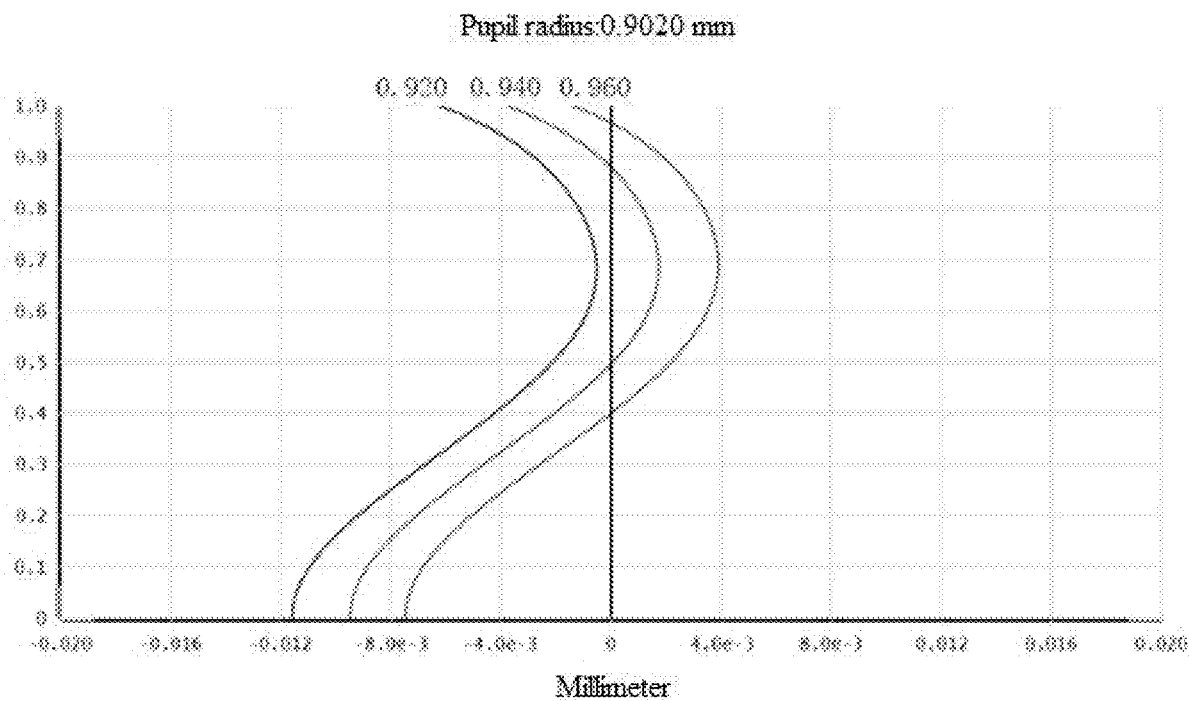
FIG. 9 is a diagram showing longitudinal aberration curves of the infrared optical imaging lens according to the second embodiment of the disclosure.
Figure 10:
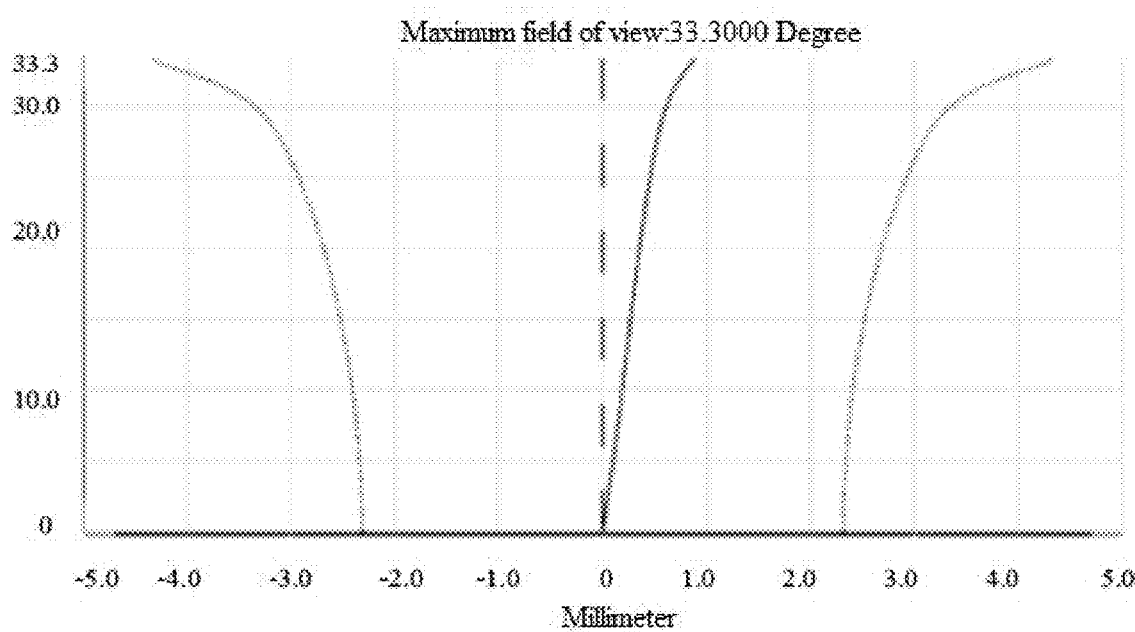
FIG. 10 is a diagram showing lateral chromatic aberration curves of the infrared optical imaging lens according to the second embodiment of the disclosure.

FIG. 6 illustrates a schematic structural diagram of an infrared optical imaging lens 200. The infrared optical imaging lens 200 provided by this embodiment is substantially similar to the infrared optical imaging lens 100 of the first embodiment, except that the radius of curvature and the material of each lens in this embodiment are different from that of the first embodiment.

Relevant parameters of every lens of the infrared optical imaging lens 200 provided in this embodiment are shown in Table 3.

TABLE 3

| Surface No. | | Radius of curvature (mm) | Thickness (mm) | Refractive index | Abbe number |
|---|---|---|---|---|---|
| | Object side | Infinity | — | | |
| | Stop ST | Infinity | −0.16 | | |
| S1 | First lens L1 | 2.304 | 1.15 | 1.73 | 54.7 |
| S2 | | 7.624 | 0.81 | | |
| S3 | Second lens L2 | −2.098 | 1.04 | 1.81 | 40.9 |
| S4 | | −1.378 | 0.06 | | |
| S5 | Third lens L3 | 7.349 | 0.73 | 1.69 | 53.2 |
| S6 | | 1.911 | 0.50 | | |
| S7 | Filter G1 | Infinity | 0.30 | 1.52 | 64.2 |
| S8 | | Infinity | 0.36 | | |
| S9 | Flat glass G2 | Infinity | 0.40 | 1.52 | 64.2 |
| S10 | | Infinity | 0.125 | | |
| | Imaging surface S11 | Infinity | — | | |

In this embodiment, aspherical parameters of every lens of the optical imaging lens 200 provided in this embodiment are shown in Table 4.

TABLE 4

| Surface No. | K | B | C | D | E | F |
|---|---|---|---|---|---|---|
| S3 | −3.524 | −0.079 | 0.013 | −0.041 | 0.077 | −0.024 |
| S4 | −3.094 | −0.089 | 0.025 | −4.198e−3 | −1.230e−3 | 1.801e−3 |
| S5 | −200.0 | −0.060 | −1.064e−3 | 0.014 | 7.147e−3 | 1.066e−3 |
| S6 | −9.802 | −0.071 | 0.018 | −3.954e−3 | 3.537e−4 | −4.087e−6 |

In this embodiment, the curves of the field curvature, the distortion, the longitudinal aberration and the lateral chromatic aberration are shown in FIG. 7, FIG. 8, FIG. 9 and FIG. 10, respectively. It can be seen from FIG. 7 that, the field curvature of the infrared optical imaging lens 200 provided in this embodiment does not exceed 0.12 mm, and the difference between field curvatures respectively in the meridian direction and the sagittal direction at the same wavelength does not exceed 0.08 mm. This indicates the field curvature is well corrected. It can be seen from FIG. 8 that, the absolute value of the distortion of the infrared optical imaging lens 200 provided in this embodiment is less than 3.5% in the full field. It indicates that the distortion is well corrected, so that captured images have too slight distortion to be corrected in digital. It can be seen from FIG. 9 that, the longitudinal chromatic aberration of the infrared optical imaging lens 200 provided by this embodiment is within ±0.12 mm in the full field. It can be seen from FIG. 10 that the lateral chromatic aberration of the infrared optical imaging lens 200 provided in this embodiment in the wavelength range from 920 to 960 nm is less than 1.0 μm in the full field, and the difference of lateral chromatic aberrations between different wavelengths is very small. This indicates the chromatic aberration of the infrared optical imaging lens 200 at the near-infrared wavelength band is well corrected.

Embodiment 3

Figure 11:
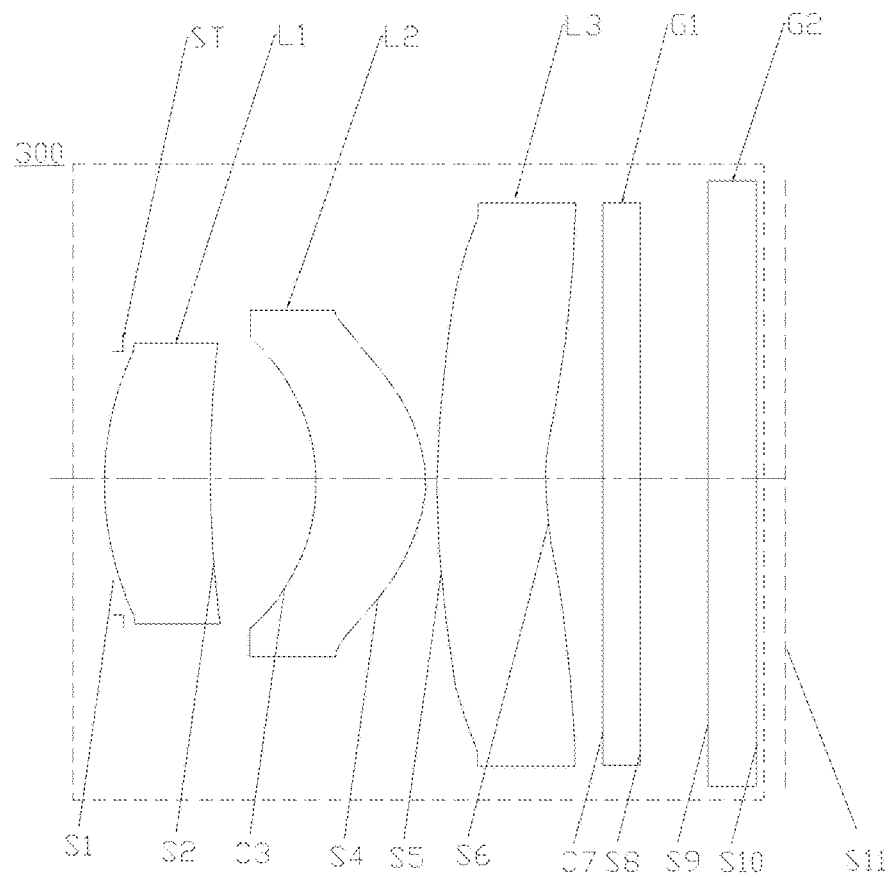
FIG. 11 is a schematic structural diagram of an infrared optical imaging lens according to a third embodiment of the disclosure.
Figure 12:
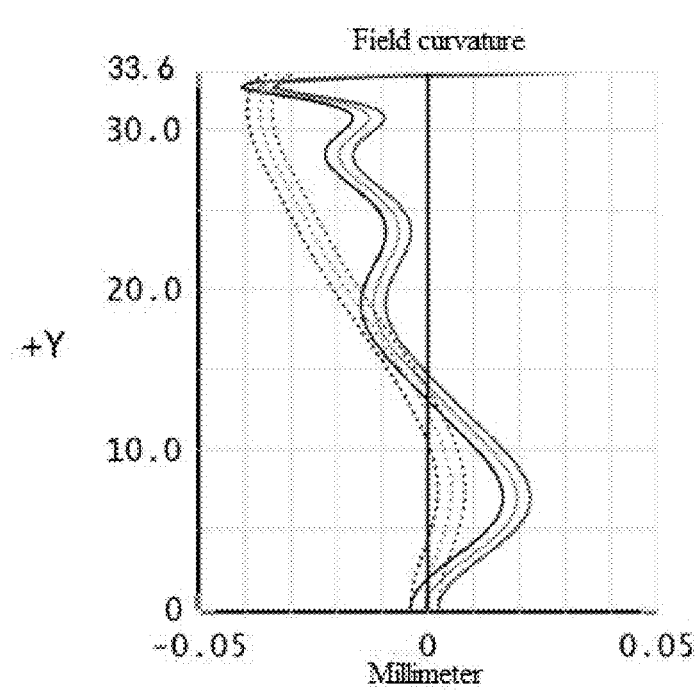
FIG. 12 is a diagram showing field curvature curves of the infrared optical imaging lens according to the third embodiment of the disclosure.
Figure 13:
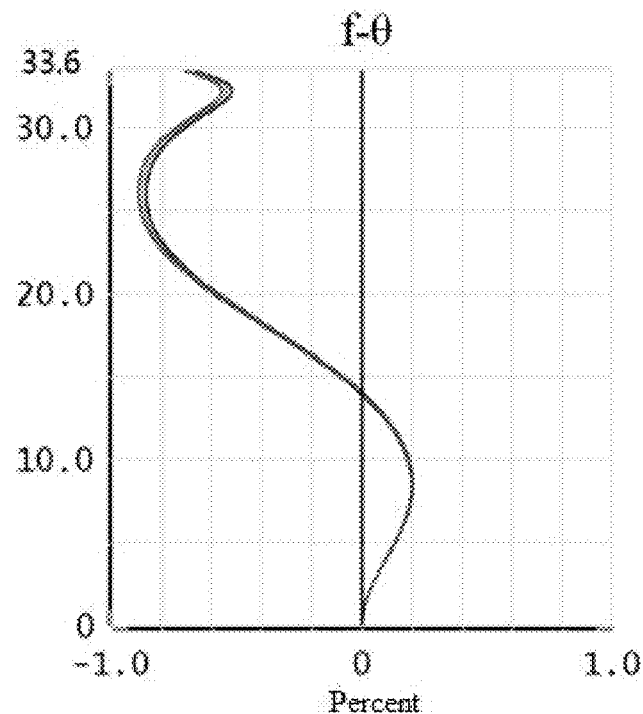
FIG. 13 is a diagram showing f-theta(θ) distortion curves of the infrared optical imaging lens according to the third embodiment of the disclosure.
Figure 14:
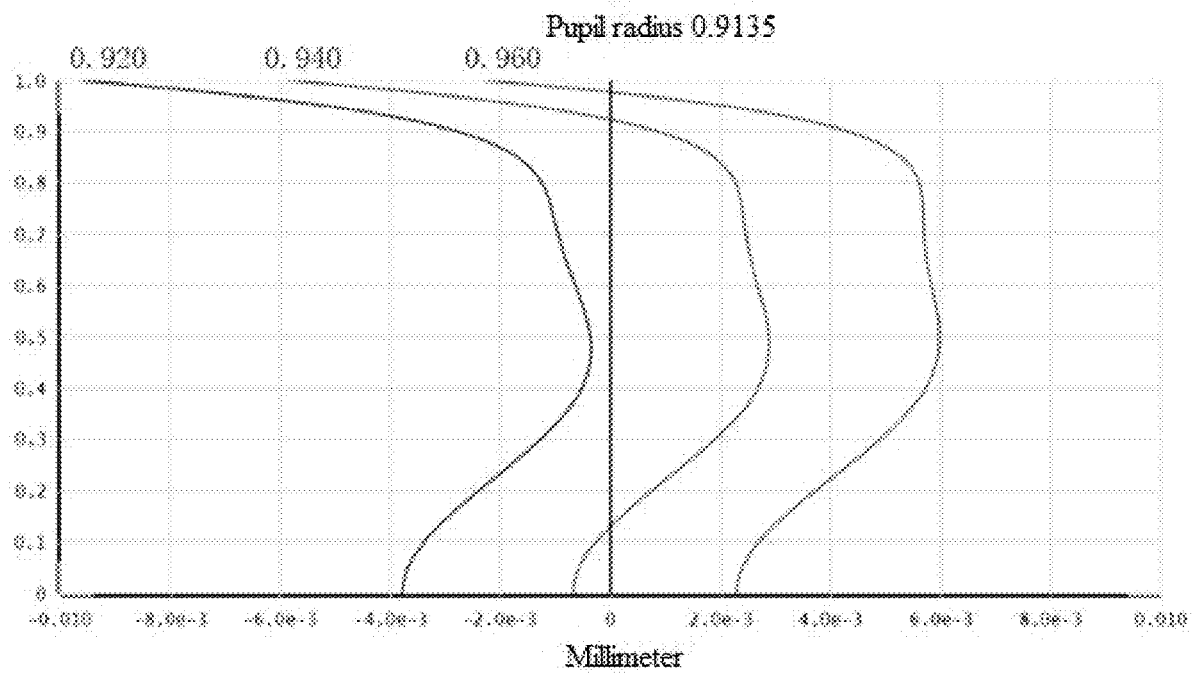
FIG. 14 is a diagram showing longitudinal aberration curves of the infrared optical imaging lens according to the third embodiment of the disclosure.
Figure 15:
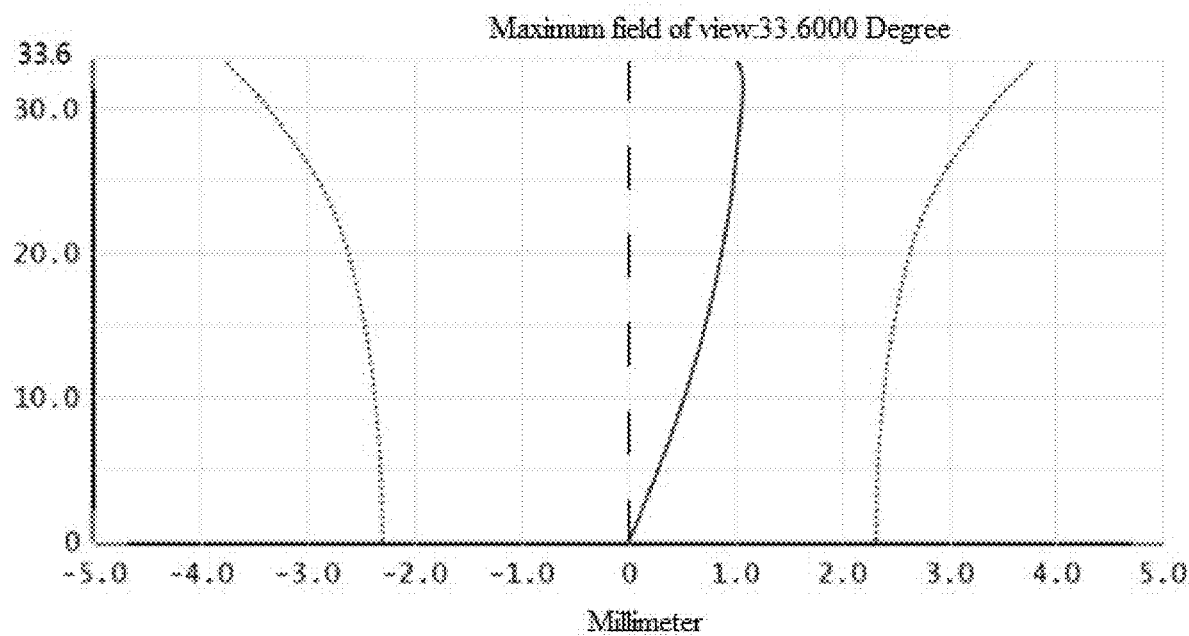
FIG. 15 is a diagram showing lateral chromatic aberration curves of the infrared optical imaging lens according to the third embodiment of the disclosure.

FIG. 11 is a schematic structural diagram of an infrared optical imaging lens 300 provided by a third embodiment of the disclosure. The structure of tire infrared optical imaging lens 300 in this embodiment is substantially the same as the structure of the infrared optical imaging lens 100 in the first embodiment. The difference lies in: the shape of the third lens L3 of the infrared optical imaging lens 300 in this embodiment is different, and the radius of curvature and material selection of each lens are different.

Relevant parameters of every lens of the infrared optical imaging lens 300 provided in this embodiment are shown in Table 5.

TABLE 5

| Surface No. | | Radius of curvature (mm) | Thickness (mm) | Refractive index | Abbe number |
|---|---|---|---|---|---|
| | Object side | Infinity | — | | |
| | Stop ST | Infinity | −0.17 | | |
| S1 | First lens L1 | 2.257 | 1.08 | 1.67 | 22.2 |
| S2 | | 6.971 | 0.96 | | |
| S3 | Second lens L2 | 1.536 | 0.83 | 1.82 | 24.0 |
| S4 | | −1.315 | 0.06 | | |
| S5 | Third lens L3 | 3.626 | 0.90 | 1.81 | 40.9 |
| S6 | | 2.077 | 0.4 | | |
| S7 | Filter G1 | Infinity | 0.30 | 1.52 | 64.2 |
| S8 | | Infinity | 0.55 | | |
| S9 | Flat glass G2 | Infinity | 0.40 | 1.52 | 64.2 |
| S10 | | Infinity | 0.125 | | |
| | Imaging surface S11 | Infinity | — | | |

In this embodiment, aspherical parameters of every lens of the optical imaging lens provided in this embodiment are shown in Table 6.

TABLE 6

| Surface No. | K | B | C | D | E | F |
|---|---|---|---|---|---|---|
| S3 | −0.165 | −5.686e-3 | 0.140 | 0.151 | −6.206e-3 | −0.017 |
| S4 | −0.338 | −0.075 | 0.076 | −0.069 | 0.044 | −7.719e-3 |
| S5 | −36.474 | −0.047 | 0.039 | −0.013 | −2.071e-3 | −1.421e-4 |
| 56 | −8.557 | −0.064 | 0.028 | −7.111e-3 | 1.088e-3 | −7.387e-5 |

In this embodiment, the curves of the field curvature, the distortion, the longitudinal aberration and the lateral chromatic aberration are shown in FIG. 12, FIG. 13, FIG. 14 and FIG. 15 respectively. It can be seen from FIG. 12 that, the field curvature of the infrared optical imaging lens 300 provided in this embodiment does not exceed ±0.05 mm, and the difference between field curvatures respectively in the meridian direction and the sagittal direction at the same wavelength does not exceed 0.08 mm. This indicates the field curvature is well corrected. It can be seen from FIG. 13 that, the absolute value of the distortion of the infrared optical imaging lens 300 provided in this embodiment is less than 1% in the full field. It indicates that the distortion is well corrected, so that captured images have too slight distortion to be corrected in digital. It can be seen from FIG. 14 that, the longitudinal chromatic aberration of the infrared optical imaging lens 300 provided by this embodiment is within ±0.010 mm in the full field. It can be seen from FIG. 15 that the lateral chromatic aberration of the infrared optical imaging lens 300 provided in this embodiment in the wavelength range from 920 to 960 nm is less than 1.5 µm in the full field, and the difference of lateral chromatic aberrations between different wavelengths is very small. This indicates the chromatic aberration of the infrared optical imaging lens 300 at the near-infrared wavelength band is well corrected.

Embodiment 4

Figure 16:
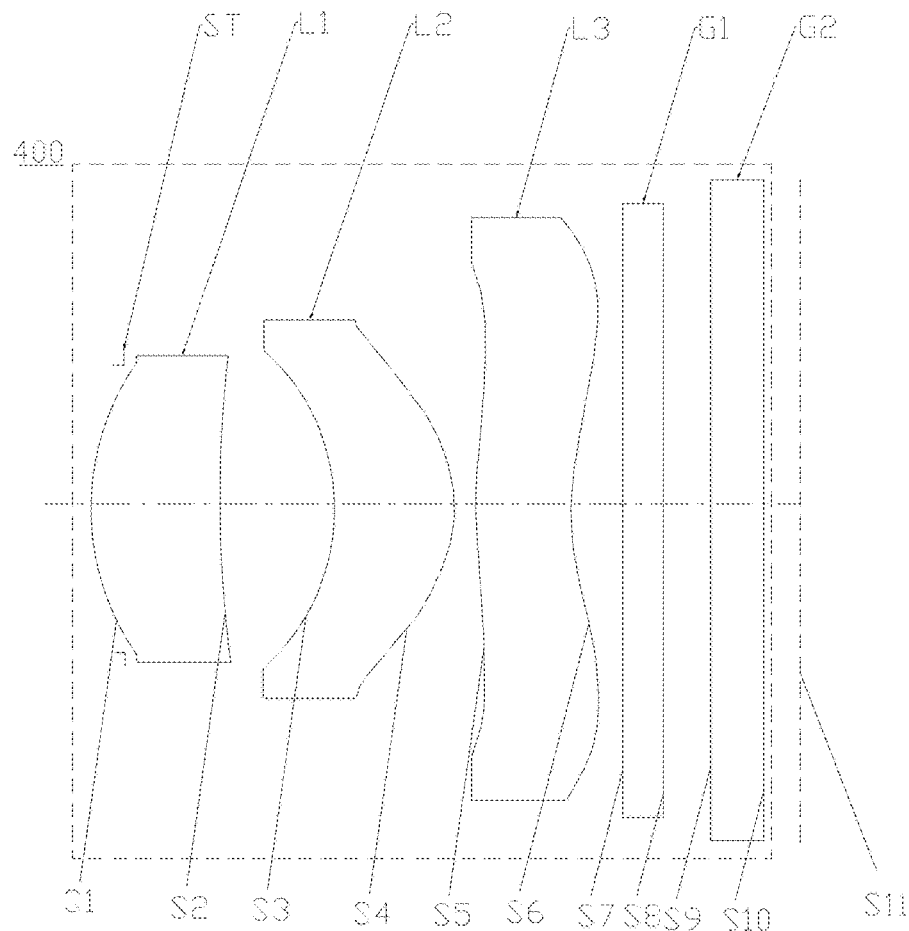
FIG. 16 is a schematic structural diagram of an infrared optical imaging lens according to a fourth embodiment of the disclosure.
Figure 17:
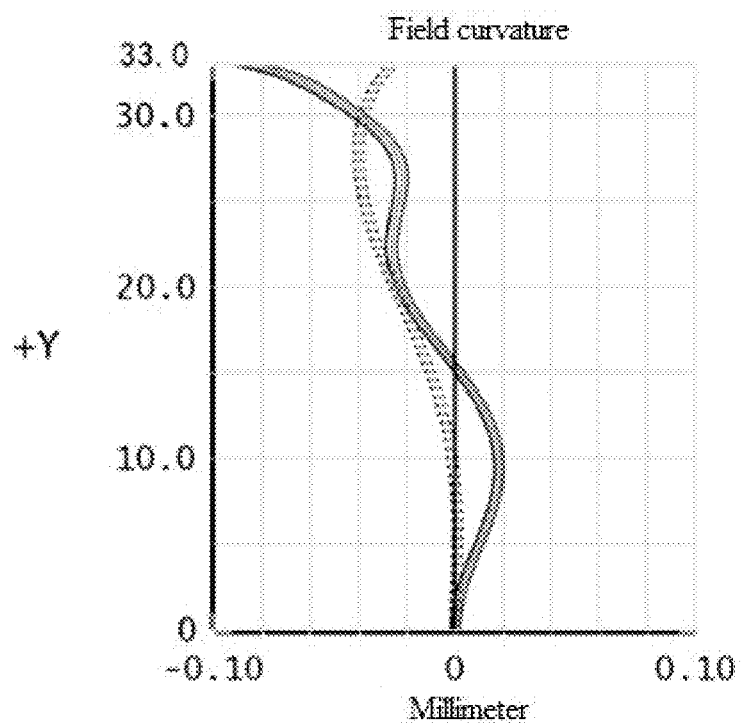
FIG. 17 is a diagram showing field curvature curves of the infrared optical imaging lens according to the fourth embodiment of the disclosure.
Figure 18:
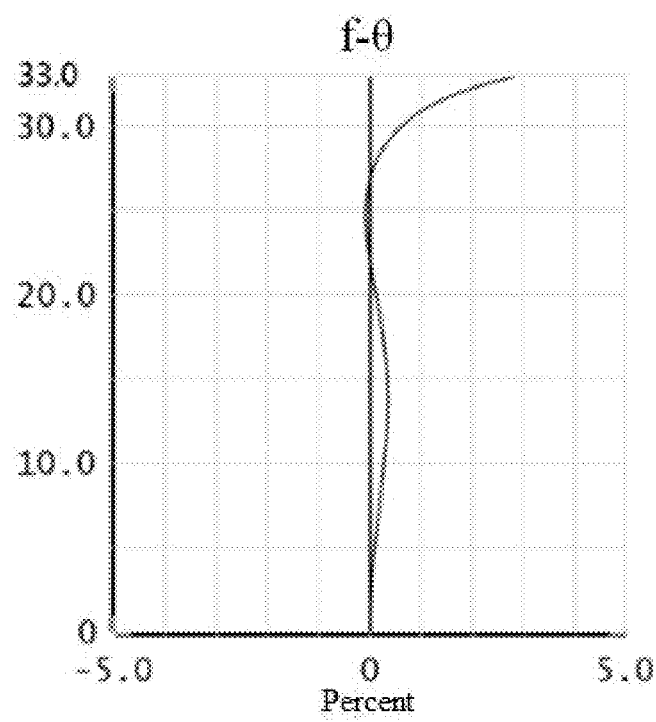
FIG. 18 is a diagram showing f-theta(θ) distortion curves of the infrared optical imaging lens according to the fourth embodiment of the disclosure.
Figure 19:
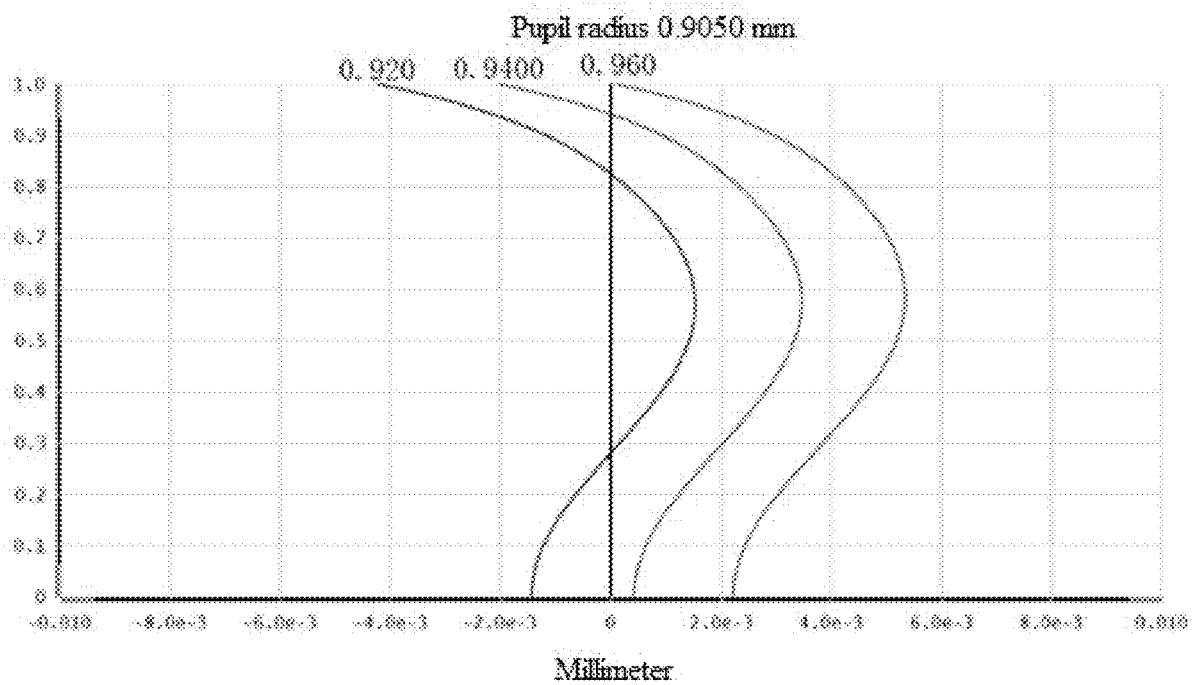
FIG. 19 is a showing longitudinal aberration curves of the infrared optical imaging lens according to the fourth embodiment of the disclosure.
Figure 20:
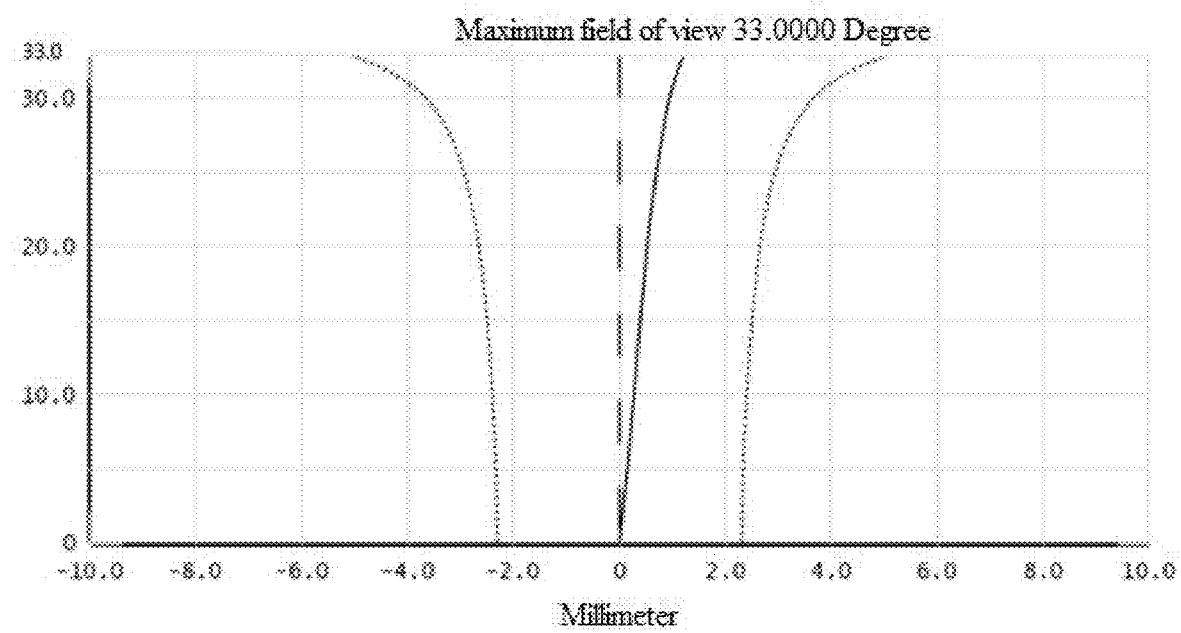
FIG. 20 is a diagram showing lateral chromatic aberration curves of the infrared optical imaging lens according to the fourth embodiment of the disclosure.

FIG. 16 is a schematic structural diagram of au infrared optical imaging lens 400 provided by a fourth embodiment of the disclosure. The structure of the infrared optical imaging lens 400 in this embodiment is substantially the same as the structure of the infrared optical imaging lens 100 in the first embodiment, except that the radius of curvature and the material of each lens in this embodiment are different from that of the first embodiment.

Relevant parameters of every lens of the infrared optical imaging lens 400 provided in this embodiment are shown in Table 7.

TABLE 7

| Surface No. | | Radius of curvature (mm) | Thickness (mm) | Refractive index | Abbe number |
|---|---|---|---|---|---|
| | Object side | Infinity | — | | |
| | Stop ST | Infinity | −0.15 | | |
| S1 | First lens L1 | 2.421 | 1.00 | 1.73 | 54.7 |
| S2 | | 8.367 | 0.96 | | |
| S3 | Second lens L2 | −1.936 | 1.02 | 1.81 | 40.9 |
| S4 | | −1.360 | 0.10 | | |
| S5 | Third lens L3 | 5.686 | 0.83 | 1.82 | 24.0 |
| S6 | | 2.171 | 0.5 | | |
| S7 | Filter G1 | Infinity | 0.30 | 1.52 | 64.2 |
| S8 | | Infinity | 0.37 | | |
| S9 | Flat glass G2 | Infinity | 0.40 | 1.52 | 64.2 |
| S10 | | Infinity | 0.125 | | |
| S11 | Imaging surface | Infinity | — | | |

In this embodiment, aspherical parameters of every lens of the optical imaging lens provided in this embodiment are shown in Table 8.

TABLE 8

| Surface No. | K | B | C | D | E | F |
|---|---|---|---|---|---|---|
| S3 | −2.676 | −0.077 | 8.605e−3 | −0.043 | 0.070 | −0.021 |
| S4 | −3.004 | −0.090 | 0.027 | −9.933e−3 | 2.581e−3 | 6.543e−4 |
| S5 | 2.388 | −0.070 | 0.020 | −1.815e−3 | 6.816e−4 | 1.450e−4 |
| S6 | −10.057 | −0.047 | 8.943e−3 | −8.531e−4 | −1.236e−4 | 2.592e−5 |

In this embodiment, the curves of the field curvature, the distortion, the longitudinal aberration and the lateral chromatic aberration are shown in FIG. 17, FIG. 18, FIG. 19 and FIG. 20 respectively. It can be seen from FIG. 17 that, the field curvature of the infrared optical imaging lens 400 provided in this embodiment does not exceed ±0.10 mm, and the difference between field curvatures respectively in the meridian direction and the sagittal direction at the same wavelength does not exceed 0.08 mm. This indicates the field curvature is well corrected. It can be seen from FIG. 18 that, the absolute value of the distortion of the infrared optical imaging ions 400 provided in this embodiment is less than 3% in the full field. It indicates that the distortion is well corrected, so that captured images have too slight distortion to be corrected in digital. It can be seen from FIG. 19 that, the longitudinal chromatic aberration of the infrared optical imaging lens 400 provided by this embodiment is within ±0.010 mm in the full field. It can be seen from FIG. 20 that the lateral chromatic aberration of the infrared optical imaging lens 400 provided in this embodiment in the wavelength range from 920 to 960 nm is less than 2 μm in the full field, and the difference of lateral chromatic aberrations between different wavelengths is very small. This indicates the chromatic aberration of the infrared optical imaging lens 400 at the near-infrared wavelength band is well corrected.

Embodiment 5

Figure 21:
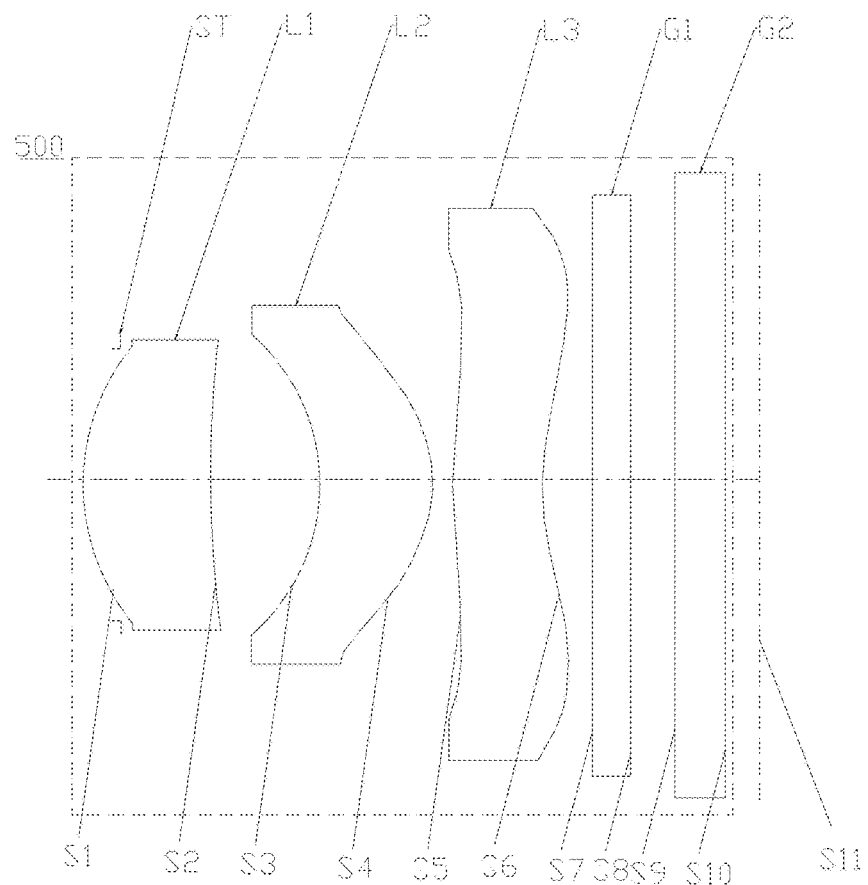
FIG. 21 is a schematic structural diagram of an infrared optical imaging lens according to a fifth embodiment of the disclosure.
Figure 22:
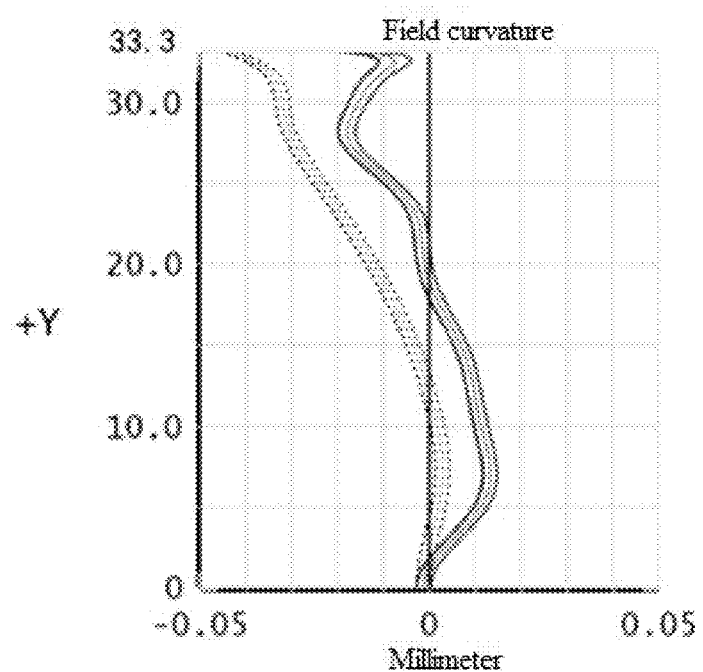
FIG. 22 is a diagram showing field curvature curves of the infrared optical imaging lens according to the fifth embodiment of the disclosure.
Figure 23:
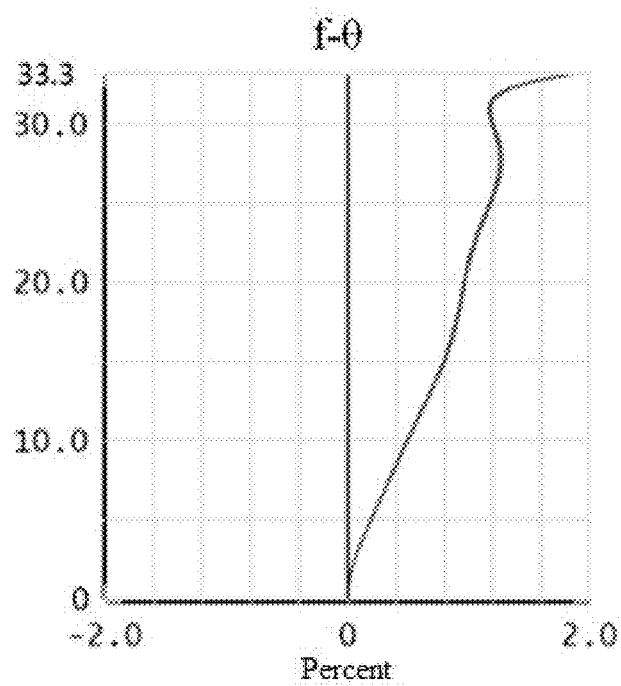
FIG. 23 is a diagram showing f-theta(θ) distortion curves of the infrared optical imaging lens according to the fifth embodiment of the disclosure.
Figure 24:
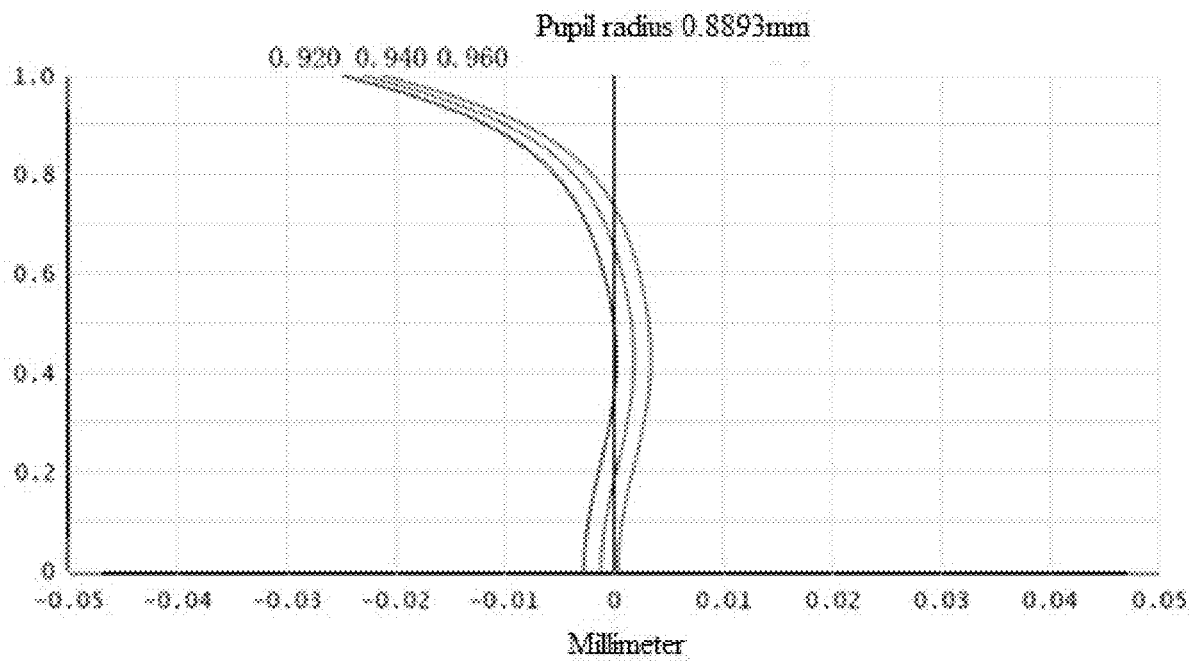
FIG. 24 is a diagram showing longitudinal aberration curves of the infrared optical imaging lens according to the fifth embodiment of the disclosure.
Figure 25:
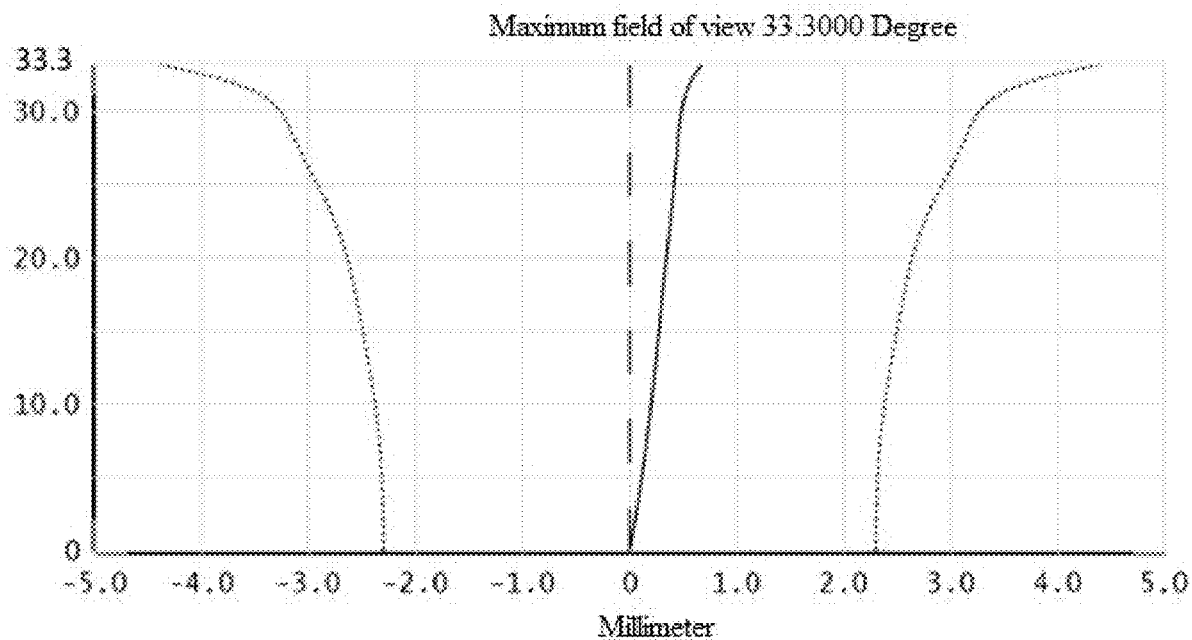
FIG. 25 is a diagram showing lateral chromatic aberration curves of the infrared optical imaging lens according to the fifth embodiment of the disclosure.

FIG. 21 is a schematic structural diagram of an infrared optical imaging lens 500 provided by a fifth embodiment of the disclosure. The structure of the infrared optical imaging lens 500 in this embodiment is substantially the same as the structure of the infrared optical imaging lens 100 in the first embodiment. The difference lies in: the first lens L1 of the infrared optical imaging lens 500 in this embodiment is a glass aspherical lens, and the radius of curvature and material selection of each lens are different.

Relevant parameters of every lens of the infrared optical imaging lens 500 provided in this embodiment are shown in Table 9.

TABLE 9

| Surface No. | | Radius of curvature (mm) | Thickness (mm) | Refractive index | Abbe number |
|---|---|---|---|---|---|
| | Object side | Infinity | — | | |
| | Stop ST | Infinity | −0.18 | | |
| S1 | First lens L1 | 1.819 | 1.25 | 1.59 | 67.0 |
| S2 | | 4.725 | 0.81 | | |
| S3 | Second lens L2 | −1.734 | 0.74 | 1.69 | 53.2 |
| S4 | | −0.929 | 0.06 | | |
| S5 | Third lens L3 | 3.684 | 0.50 | 1.69 | 53.2 |
| S6 | | 1.103 | 0.5 | | |
| S7 | Filter G1 | Infinity | 0.30 | 1.52 | 64.2 |
| S8 | | Infinity | 0.28 | | |
| S9 | Flat glass G2 | Infinity | 0.40 | 1.52 | 64.2 |
| S10 | | Infinity | 0.125 | | |
| S11 | Imaging surface | Infinity | — | | |

In this embodiment, aspherical parameters of every lens of the optical imaging lens provided in this embodiment are shown in Table 10.

TABLE 10

| Surface No. | K | B | C | D | E | F |
|---|---|---|---|---|---|---|
| S1 | 0 | 1.550e−3 | 4.592e−3 | −7.479e−3 | 8.562e−3 | −3.116e−3 |
| S2 | 0 | 0.027 | 5.471e−3 | 0.023 | −0.026 | 0.014 |
| S3 | −6.218 | −0.179 | −0.014 | 0.011 | 0.098 | −0.048 |
| S4 | −4.098 | −0.243 | 0.194 | −0.168 | 0.100 | −0.0198 |
| S5 | −1.017 | −0.155 | 0.090 | −0.027 | 3.043e−3 | −5.906e−5 |
| S6 | −7.641 | −0.086 | 0.033 | −7.236e−3 | 5.004e−4 | 3.299e−6 |

In this embodiment, the curves of the field curvature, the distortion, the longitudinal aberration and the lateral chromatic aberration are shown in FIG. 22, FIG. 23, FIG. 24 and FIG. 25 respectively. It can be seen from FIG. 22 that, tire field curvature of the infrared optical imaging lens 500 provided in this embodiment does not exceed ±0.05 mm, and the difference between field curvatures respectively in the meridian direction and the sagittal direction at the same wavelength does not exceed 0.05 mm. This indicates the field curvature is well corrected. It can be seen from FIG. 23 that, the absolute value of the optical distortion of the infrared imaging lens 500 provided in this embodiment is less than 2% in the full field. It indicates that the distortion is well corrected, so that captured images have too slight distortion to be corrected in digital. It can be seen from FIG. 24 that, the longitudinal chromatic aberration of the infrared optical imaging lens 500 provided by this embodiment is within ±0.03 mm in the full field. It can be seen from FIG. 25 that the lateral chromatic aberration of the infrared optical imaging lens 500 provided in this embodiment in the wavelength range from 920 to 960 nm is less than 1 μm in the full field, and the difference of lateral chromatic aberrations between different wavelengths is very small. This indicates the chromatic aberration of the infrared optical imaging lens 500 at the near-infrared wavelength band is well corrected.

Embodiment 6

Figure 26:
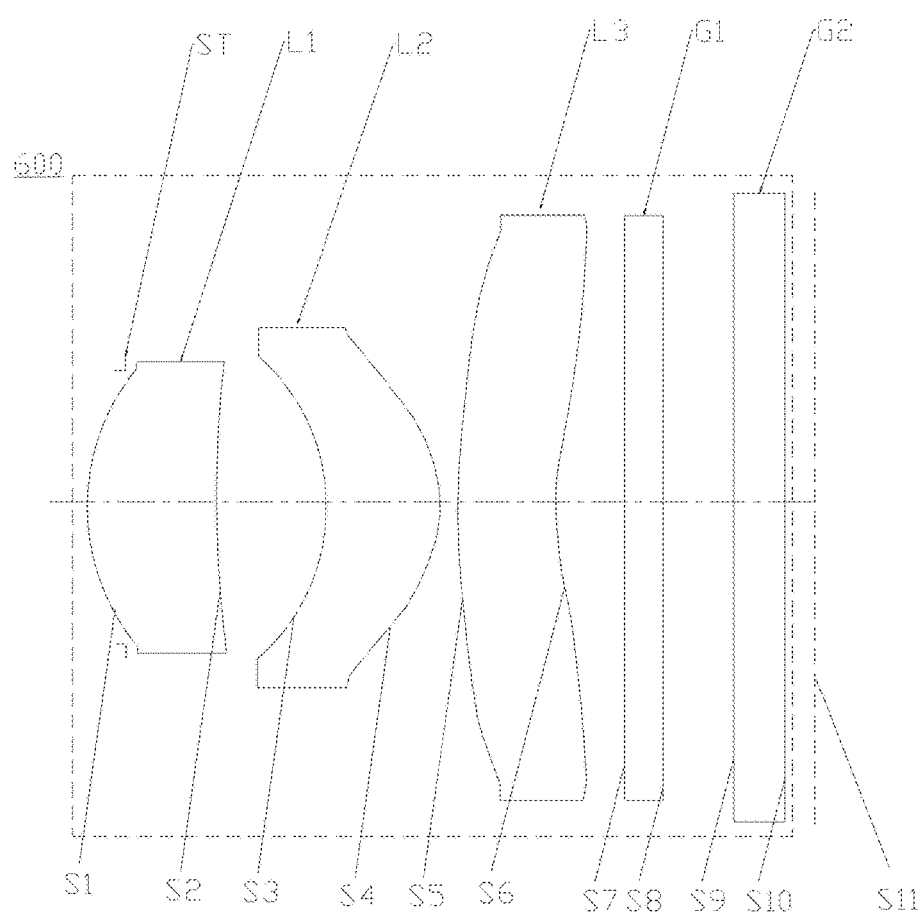
FIG. 26 is a schematic structural diagram of an infrared optical imaging lens according to a sixth embodiment of the disclosure.
Figure 27:
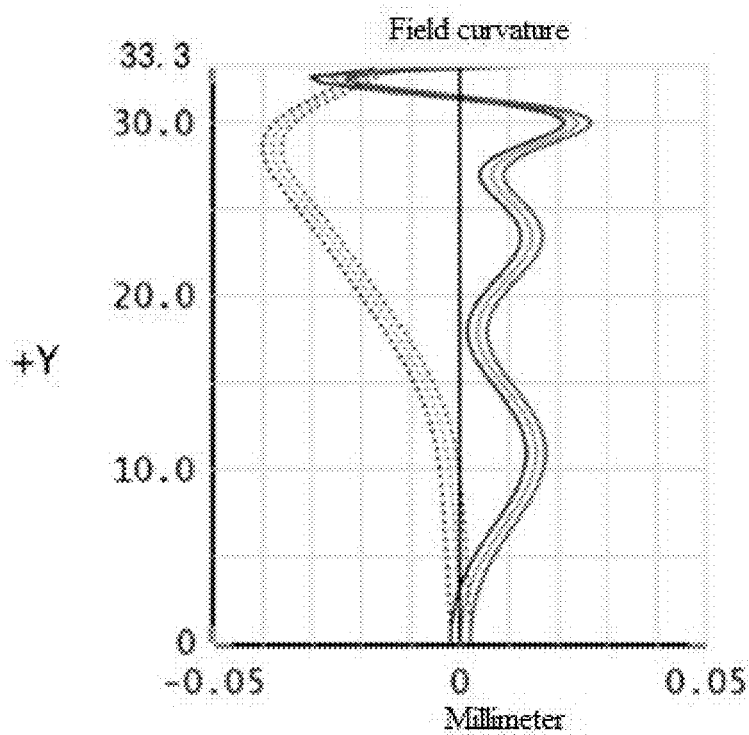
FIG. 27 is a diagram showing field curvature curves of the infrared optical imaging lens according to the sixth embodiment of the disclosure.
Figure 28:
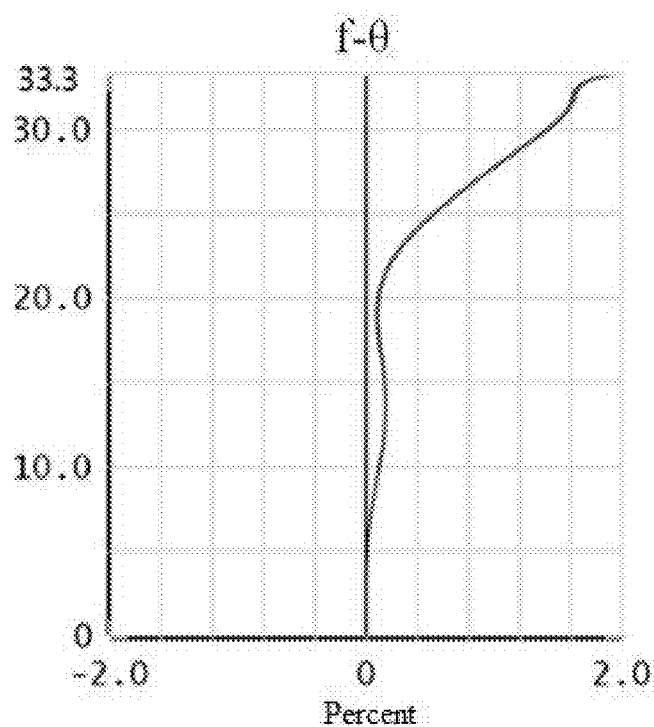
FIG. 28 is a diagram showing f-theta(θ) distortion curves of the infrared optical imaging lens according to the sixth embodiment of the disclosure.
Figure 29:
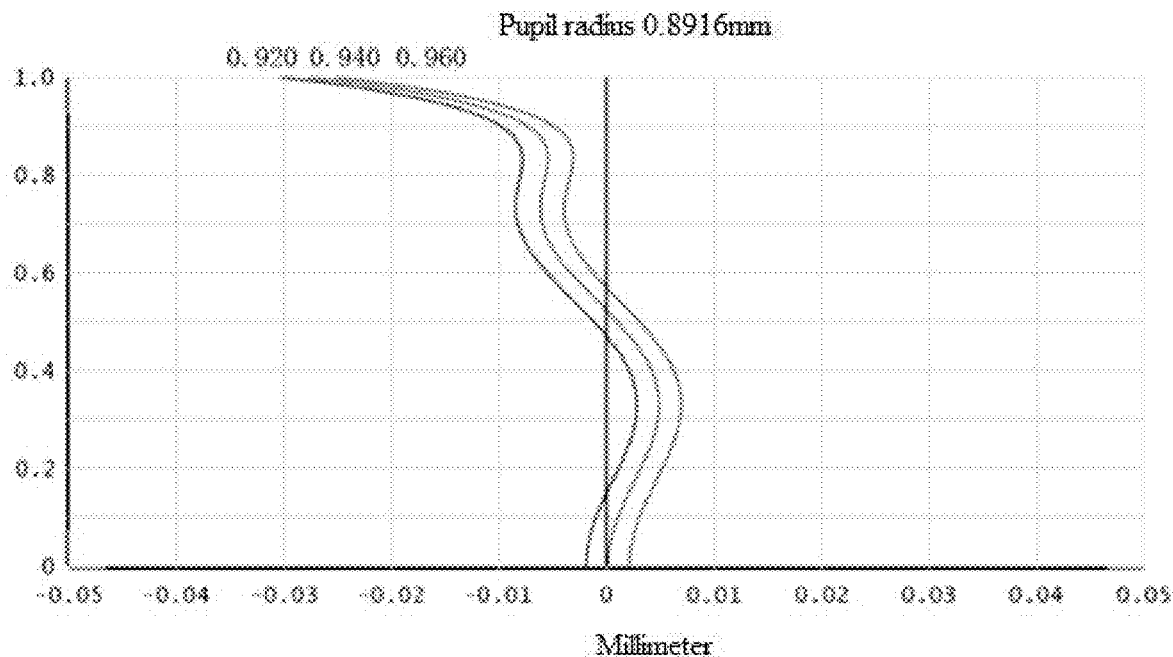
FIG. 29 is a showing longitudinal aberration curves of the infrared optical imaging lens according to the sixth embodiment of the disclosure.
Figure 30:
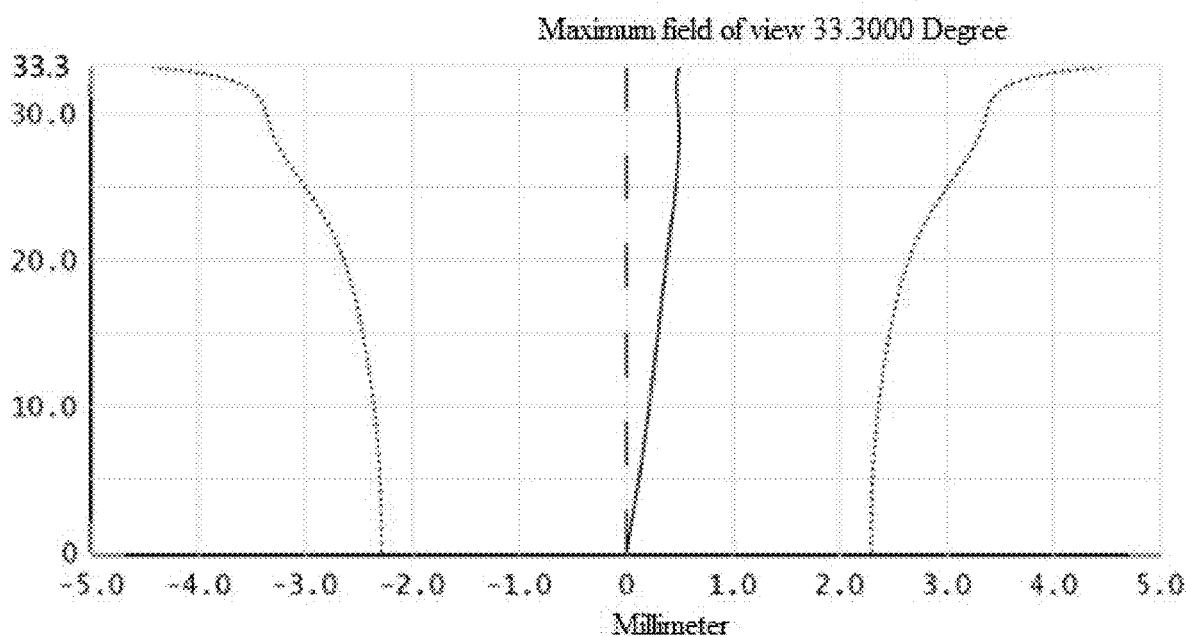
FIG. 30 is a diagram showing lateral chromatic aberration curves of the infrared optical imaging lens according to the sixth embodiment of the disclosure.

FIG. 26 is a schematic structural diagram of an infrared optical imaging lens 600 provided by a sixth embodiment of the disclosure. The structure of the infrared optical imaging lens 600 in this embodiment is substantially the same as the structure of the infrared optical imaging lens 300 in the third embodiment. The difference lies in: the first lens L1 of the infrared optical imaging lens 600 in this embodiment is a glass aspherical lens, and the radius of curvature and material selection of each lens are different.

Relevant parameters of every lens of the infrared optical imaging lens 600 provided in this embodiment are shown in Table 11.

TABLE 11

| Surface No. | | Radius of curvature (mm) | Thickness (mm) | Refractive index | Abbe number |
| --- | --- | --- | --- | --- | --- |
| | Object side | Infinity | — | | |
| | Stop ST | Infinity | −0.26 | | |
| S1 | First lens L1 | 1.646 | 1.0 | 1.59 | 59.5 |
| S2 | | 3.875 | 0.749 | | |
| S3 | Second lens L2 | −1.359 | 0.854 | 1.59 | 61.3 |
| S4 | | −0.870 | 0.183 | | |
| S5 | Third lens L3 | 4.303 | 0.50 | 1.59 | 61.3 |
| S6 | | 1.293 | 0.5 | | |
| S7 | Filter G1 | Infinity | 0.30 | 1.52 | 64.2 |
| S8 | | Infinity | 0.34 | | |
| S9 | Flat glass G2 | Infinity | 0.40 | 1.52 | 64.2 |
| S10 | | Infinity | 0.125 | | |
| S11 | Imaging surface | Infinity | — | | |

In this embodiment, aspherical parameters of every lens of the optical imaging lens provided in this embodiment are shown in Table 12.

TABLE 12

| Surface No. | K | B | C | D | E | F |
| --- | --- | --- | --- | --- | --- | --- |
| S1 | 0 | 7.896e−3 | 7.680e−3 | 2.433e−3 | −4.292e−3 | 4.840e−3 |
| S2 | 0 | 0.461 | −0.074 | 0.315 | −0.411 | 0.213 |
| S3 | −7.676 | −0.077 | 8.605e−3 | −0.043 | 0.070 | −0.021 |
| S4 | −3.004 | −0.090 | 0.027 | −9.933e−3 | 2.581e−3 | 6.543e−4 |
| S5 | 2.388 | −0.070 | 0.020 | −1.815e−3 | 6.816e−4 | 1.450e−4 |
| S6 | −10.057 | −0.047 | 8.943e−3 | −8.531e−4 | −1.236e−4 | 2.592e−5 |

In this embodiment, the curves of the field curvature, the distortion, the longitudinal aberration and the lateral chromatic aberration are shown in FIG. 27, FIG. 28, FIG. 29 and FIG. 30 respectively. It can be seen from FIG. 27 that, the field curvature of the infrared optical imaging lens 600 provided in this embodiment does not exceed ±0.05 mm, and the difference between field curvatures respectively in the meridian direction and the sagittal direction at the same wavelength does not exceed 0.05 mm. This indicates the field curvature is well corrected. It can be seen from FIG. 28 that, the absolute value of the distortion of the infrared optical imaging lens 600 provided in this embodiment is less than 2% in the full field it indicates that the distortion is well corrected, so that captured images have too slight distortion to be corrected in digital. It can be seen from FIG. 29 that, the longitudinal chromatic aberration of the infrared optical imaging lens 600 provided by this embodiment is within ±0.035 mm in the full field. It can be seen from FIG. 30 that the lateral chromatic aberration of the infrared optical imaging lens 600 provided in this embodiment in the wavelength range from 920 to 960 nm is less than 1 μm in the full field, and the difference of lateral chromatic aberrations between different wavelengths is very small. This indicates the chromatic aberration of the infrared optical imaging lens 600 at the near-infrared wavelength band is well corrected.

Table 13 shows optical characteristics corresponding to the infrared optical imaging lens in the above six embodiments, including the focal length f, the aperture number Fno, and the field angle 2θ, the total optical length $T_L$, and values corresponding to each of the above-labeled expressions.

TABLE 13

| Embodiment | 1 | 2 | 3 | 4 | 5 | 6 |
|---|---|---|---|---|---|---|
| f (mm) | 3.59 | 3.61 | 3.65 | 3.62 | 3.56 | 3.57 |
| Fno | 2.02 | 2.02 | 2.01 | 2.01 | 2.00 | 2.00 |
| 2θ | 6° | 66.6° | 67.2° | 66° | 66.6° | 66.6° |
| $T_L$ (mm) | 5.26 | 5.47 | 5.61 | 5.61 | 4.97 | 4.97 |
| IH/(f*tanθ) | 1.023 | 1.043 | 0.998 | 1.034 | 0.983 | 1.024 |
| $\varphi_1/\varphi$ | 0.873 | 0.853 | 0.781 | 0.814 | 0.814 | 0.834 |
| $\varphi*T_L$ | 1.467 | 1.516 | 1.536 | 1.549 | 1.397 | 1.393 |
| $R1/T_L$ | 0.351 | 0.421 | 0.402 | 0.432 | 0.366 | 0.331 |
| $\varphi_2/\varphi_3$ | −1.258 | −1.399 | −1.911 | −1.525 | −1.172 | −1.335 |
| (dn/dt)2 | −3.0 | 8.0 | −0.2 | 8.0 | 4.5 | 3.9 |
| (dn/dt)3 | 8.0 | 4.5 | 8.0 | −0.2 | 4.5 | 3.9 |
| (CT2 + ET3) − (ET2 + CT3) | 0.206 | 0.337 | 0.129 | 0.358 | 0.268 | 0.35 |
| R3/CT2 | −1.590 | −2.017 | −1.851 | −1.898 | −2.343 | −1.591 |
| R4/CT2 | −1.078 | −1.277 | −1.594 | −1.333 | −1.255 | −1.019 |

Based on the foregoing embodiments, the infrared optical imaging lenses provided by the present disclosure reach the following optical parameters: (1) the total optical length $T_L$<5.7 mm: (2) the applicable spectral range is 800 nm~1100 nm.

Based on the above embodiments, the infrared optical imaging lens provided by the present disclosure has the following advantages:

(1) The infrared optical imaging lens adopts a design of three glass lenses. By reasonably collocating at least one glass spherical lens and at least one aspherical lens and matching the focal power of the three lenses, the infrared optical imaging lens realizes miniaturization and ensures the resolution, specifically the lens can still clearly image with a stable performance after being baked at a high temperature of more than 230° C.

(2) Conventional lenses are designed applicable in the wavelength of 435~656 nm (visible light), so their resolution for the infrared light is poor. The infrared optical imaging lens provided by the present disclosure can clearly image in the wavelength band of 800 nm~1100 nm (near infrared region) with good imaging quality, thereby meeting infrared imaging characteristics in the DMS and requirements of high imaging quality.

Embodiment 7

Figure 31:
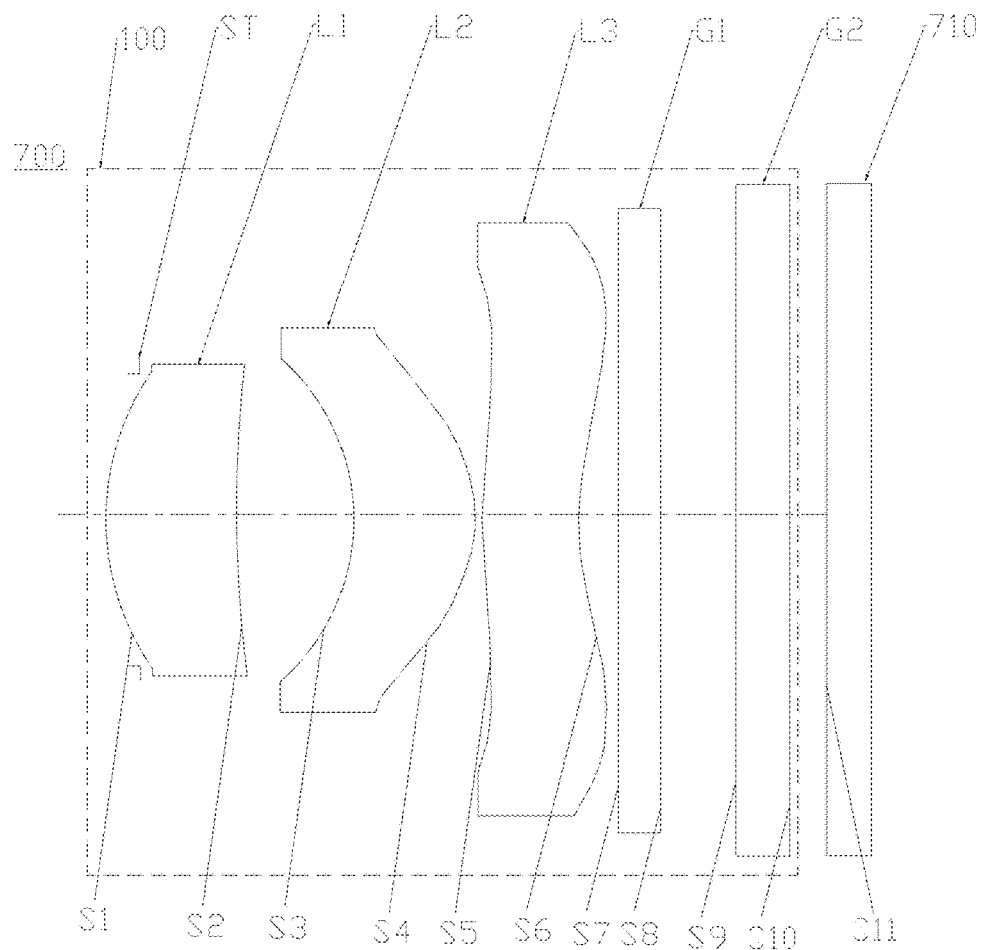
FIG. 31 is a schematic structural diagram of an imaging device according to a seventh embodiment of the disclosure.

FIG. 31 is a schematic structural diagram of an imaging device 700 provided by a seventh embodiment of the disclosure. The imaging device 700 includes an imaging element 710 and an infrared optical imaging lens in any of the foregoing embodiments, such as the infrared optical imaging lens 100. The imaging element 710 can be a CMOS (Complementary Metal Oxide) image sensor or a CCD (Charge Coupled Device Semiconductor) image sensor.

The imaging device 700 can be a sport camera, vehicle monitor, security monitoring camera, or any other form of electronic equipment equipped with an infrared optical imaging lens.

The imaging device 700 provided in this embodiment includes an infrared optical imaging lens 100. As the infrared optical imaging lens has the advantages of miniaturization, high-temperature resistance and high imaging quality, so that the imaging device 700 has the advantages of small volume and good thermal stability, it can meet the infrared imaging characteristics of the DMS and meet the high imaging quality requirements.

Embodiment 8

Figure 32:
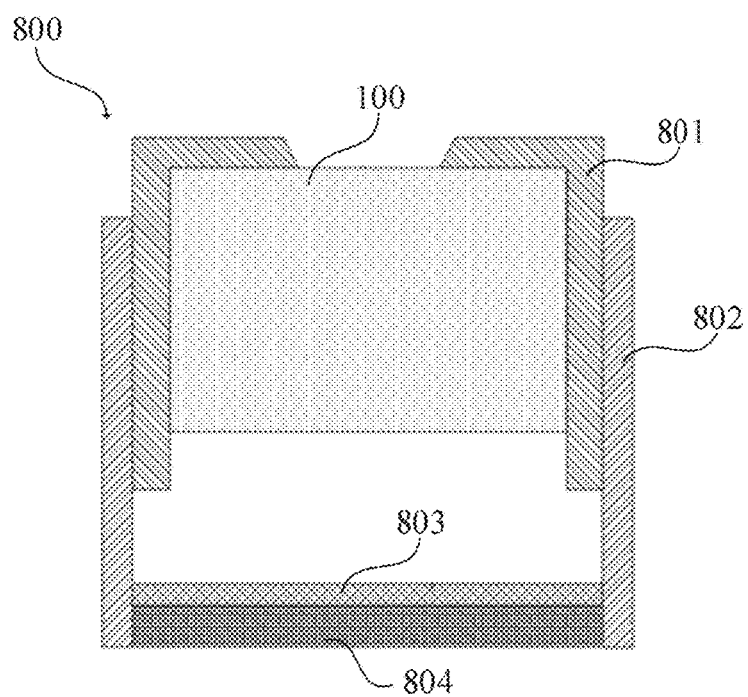
FIG. 32 is a schematic structural diagram showing a cross-section of a camera module according to a eighth embodiment of the disclosure.

FIG. 32 illustrates a structural diagram of a camera module 800. The camera module 800 includes a barrel 801, a holder 802, an image sensor 803, a printed circuit board 804, and the infrared optical imaging lens of any one of the foregoing embodiments. FIG. 32 takes the infrared optical imaging lens 100 of the first embodiment as an example. The infrared optical imaging lens 100 is mounted in the barrel 801, the image sensor 803 is mounted in the holder 802, and the barrel 801 is movable mounted on the holder 802. The infrared optical imaging lens 100 is configured to form an optical image. The image sensor 803 is opposite to the infrared optical imaging lens 100 and is configured to generate image data for the optical image sensed thereby. The image sensor 803 may be a CMOS sensor or a CCD sensor.

It is noted that the image sensor 805 may be mounted on the printed circuit board 804, or may be electrically connected with a processing chip, to process the image data.

Embodiment 9

Figure 33:
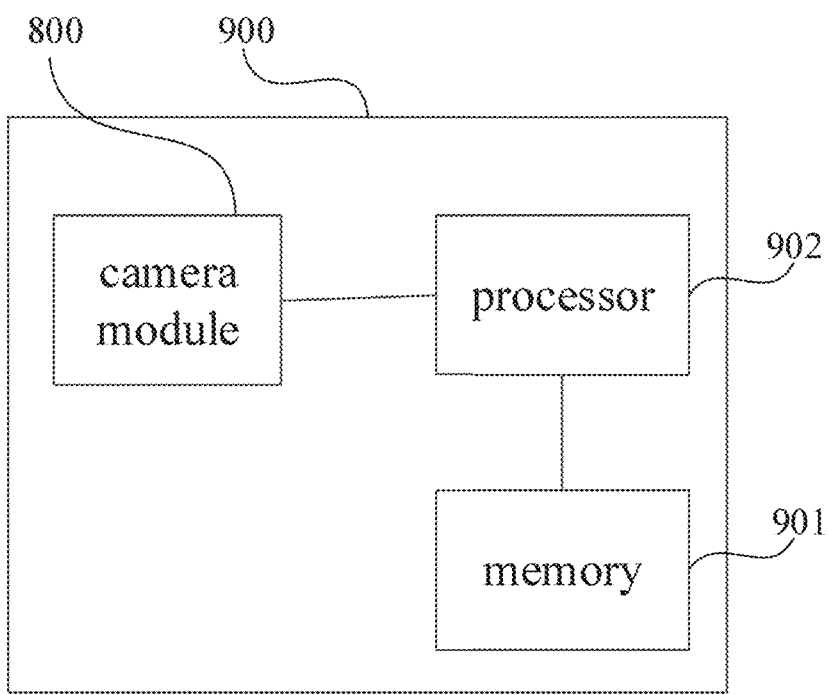
FIG. 33 is a schematic block diagram of a DMS according to a ninth embodiment of the disclosure.
Figure 34:
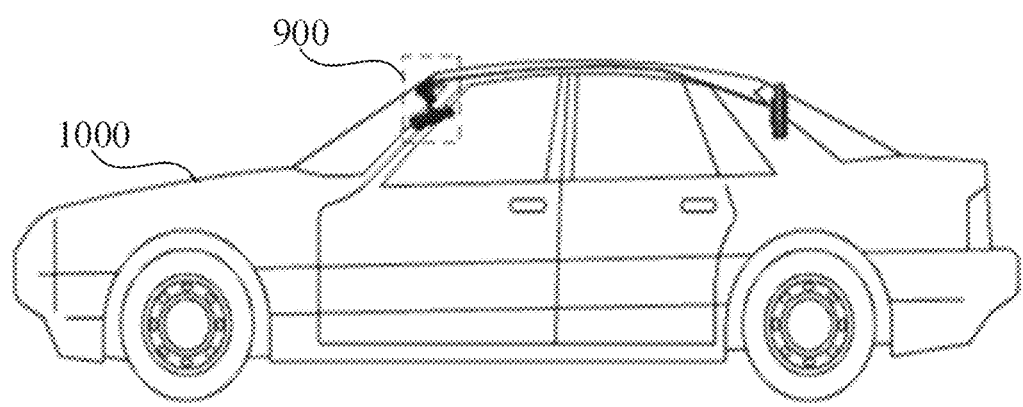
FIG. 34 is a schematic diagram of the DMS according to the ninth embodiment of the disclosure.

FIG. 33 is a block diagram of a DMS 900 provided in this embodiment. The DMS 900 includes a memory 901, a processor 902, and the camera module 800 as described above. The memory 901 and the camera module 800 are both electrically connected with the processor 902. The camera module 800 is configured to capture images, the processor 902 is configured to acquire and process image data of the captured images, the memory 901 is configured to store the image data of the captured images. As illustrated in FIG. 34, the DMA 900 is installed in a car 1000, and is configured to monitor the driver, thereby ensuring the safety of the driving.

The above embodiments just describe some implementation manners of the disclosure, the descriptions are specific and detailed, but cannot be understood as limiting the scope of the application. It should be noted that, for those of ordinary skill in the art, without departing from the concept of the application, modifications and improvements can be made, which should belong to the protection scope of the application. Therefore, the protection scope of this application should be subject to the appended claims.

What is claimed is:

1. An infrared optical imaging lens, from an object side to an imaging plane along an optical axis thereof, sequentially comprising:
   a stop;
   a first lens with a positive focal power, an object side surface of the first lens being convex, an image side surface of the first lens being concave;
   a second lens with a positive focal power, an object side surface of the second lens being concave, an image side surface of the second lens being convex;
   a third lens with a negative focal power, a paraxial region of an object side surface of the third lens being convex, a paraxial region of an image side surface of the third lens being concave; and
   a filter;
   wherein the first lens is a glass lens, the second lens and the third lens are both glass aspherical lenses, and optical centers of the first lens, the second lens and the third lens are positioned in a straight line;
   wherein the infrared optical imaging lens meets the expressions:

$3.0 \text{ mm} < f < 4.0 \text{ mm}$, $-3.0 \times 10^{-6}/°C. \leq (dn/dt)2 \leq -0.2 \times 10^{-6}/°C.$ and $3.9 \times 10^{-6}/°C. \leq (dn/dt)2 < 8.5 \times 10^{-6}/°C.$, and $3.9 \times 10^{-6}/°C. \leq (dn/dt)3 < 8.5 \times 10^{-6}/°C.$;

where f represents a focal length of the infrared optical imaging lens, (dn/dt)2 represents a temperature coefficient of a refractive index of the second lens, and (dn/dt)3 represents a temperature coefficient of a refractive index of the third lens;
   wherein the infrared optical imaging lens further meets the expression:

$1.393 \leq \varphi * T_L < 1.6$;

where $\varphi$ represents a focal power of the infrared optical imaging lens, $T_L$ represents a total optical length of the infrared optical imaging lens from the object side surface of the first lens to the imaging plane;
   wherein the infrared optical imaging lens is applied to a driver monitoring system of a vehicle, and system performance of the infrared optical imaging lens before and after a reflow process with a highest ambient temperature of 230° C.-260° C. is consistent.

2. The infrared optical imaging lens as claimed in claim 1, wherein the infrared optical imaging lens meets the expression:

$0.95 < IH/(f * \tan \theta) < 1.05$;

where IH represents a half image height of the infrared optical imaging lens, and $\theta$ represents a half field of view of the infrared optical imaging lens.

3. The infrared optical imaging lens as claimed in claim 1, wherein the infrared optical imaging lens meets the expression:

$0.7 < \varphi_1/\varphi < 0.95$;

where $\varphi_1$ represents a focal power of the first lens.

4. The infrared optical imaging lens as claimed in claim 1, wherein the infrared optical imaging lens meets the expression:

$-2 < \varphi_2/\varphi_3 < -1.1$;

where $\varphi_2$ represents a focal power of the second lens, $\varphi_3$ represents a focal power of the third lens.

5. The infrared optical imaging lens as claimed in claim 1, wherein the infrared optical imaging lens meets the expression:

$0.3 < R1/T_L < 0.46$;

where R1 represents a radius of curvature of the object side surface of the first lens.

6. The infrared optical imaging lens as claimed in claim 1, wherein the infrared optical imaging lens meets the expression:

$0.1 < (CT2+ET3)-(ET2+CT3) < 0.4$;

where CT2 represents a center thickness of the second lens, ET2 represents an edge thickness of the second lens, CT3 represents a center thickness of the third lens, ET3 represents an edge thickness of the third lens.

7. The infrared optical imaging lens as claimed in claim 1, wherein the infrared optical imaging lens meets the expressions:

$-2.4 < R3/CT2 < -1.5$, $-1.6 < R4/CT2 < -1$;

where R3 represents a radius of curvature of the object side surface of the second lens, R4 represents a radius of curvature of the image side surface of the second lens, CT2 represents a center thickness of the second lens.

8. The infrared optical imaging lens as claimed in claim 1, wherein an applicable spectral range of the infrared optical imaging lens is 800 nm to 1100 nm.

9. The infrared optical imaging lens as claimed in claim 1, wherein the infrared optical imaging lens meets the expression:

$4.97 \text{ mm} \leq T_L \leq 5.61 \text{ mm}$.

10. A camera module, comprising a barrel, a holder, an image sensor, and an infrared optical imaging lens, wherein the infrared optical imaging lens is mounted in the barrel, the image sensor is mounted in the holder, and the barrel is movably mounted on the holder, the infrared optical imaging lens is configured to form an optical image, the image sensor is configured to generate image data for the optical image sensed thereby,
    wherein the infrared optical imaging lens comprises:
    a stop;
    a first lens with a positive focal power, an object side surface of the first lens being convex, an image side surface of the first lens being concave;
    a second lens with a positive focal power, an object side surface of the second lens being concave, an image side surface of the second lens being convex;
    a third lens with a negative focal power, a paraxial region of an object side surface of the third lens being convex, a paraxial region of an image side surface of the third lens being concave; and
    a filter;
    wherein the first lens is a glass lens, the second lens and the third lens are both glass aspherical lenses, and optical centers of the first lens, the second lens and the third lens are positioned in a straight line;

wherein the infrared optical imaging lens meets the expressions:

$$3.0 \text{ mm} < f < 4.0 \text{ mm},$$

$$-3.0 \times 10^{-6}/°C. \leq (dn/dt)2 \leq -0.2 \times 10^{-6}/°C. \text{ and } 3.9 \times 10^{-6}/°C. \leq (dn/dt)2 < 8.5 \times 10^{-6}/°C., \text{ and}$$

$$3.9 \times 10^{-6}/°C. \leq (dn/dt)3 < 8.5 \times 10^{-6}/°C.;$$

where f represents a focal length of the infrared optical imaging lens, (dn/dt)2 represents a temperature coefficient of a refractive index of the second lens, and (dn/dt)3 represents a temperature coefficient of a refractive index of the third lens;

wherein the infrared optical imaging lens further meets the expression:

$$1.393 \leq \varphi * T_L < 1.6;$$

where φ represents a focal power of the infrared optical imaging lens, $T_L$ represents a total optical length of the infrared optical imaging lens from the object side surface of the first lens to the imaging plane;

wherein the infrared optical imaging lens is applied to a driver monitoring system of a vehicle, and system performance of the infrared optical imaging lens before and after a reflow process with a highest ambient temperature of 230° C.-260° C. is consistent.

11. The camera module as claimed in claim 10, wherein the infrared optical imaging lens meets the expression:

$$0.95 < \text{IH}/(f * \tan \theta) < 1.05;$$

where IH represents a half image height of the infrared optical imaging lens, and θ represents a half field of view of the infrared optical imaging lens.

12. The camera module as claimed in claim 10, wherein the infrared optical imaging lens meets the expression:

$$0.7 < \varphi_1/\varphi < 0.95;$$

where $\varphi_1$ represents a focal power of the first lens.

13. The camera module as claimed in claim 10, wherein the infrared optical imaging lens meets the expression:

$$-2 < \varphi_2/\varphi_3 < -1.1;$$

where $\varphi_2$ represents a focal power of the second lens, $\varphi_3$ represents a focal power of the third lens.

14. The camera module as claimed in claim 10, wherein the infrared optical imaging lens meets the expression:

$$0.3 < R1/T_L < 0.46;$$

where R1 represents a radius of curvature of the object side surface of the first lens.

15. The camera module as claimed in claim 10, wherein the infrared optical imaging lens meets the expression:

$$0.1 < (CT2+ET3)-(ET2+CT3) < 0.4;$$

where CT2 represents a center thickness of the second lens, ET2 represents an edge thickness of the second lens, CT3 represents a center thickness of the third lens, ET3 represents an edge thickness of the third lens.

16. The camera module as claimed in claim 10, wherein the infrared optical imaging lens meets the expressions:

$$-2.4 < R3/CT2 < -1.5,$$

$$-1.6 < R4/CT2 < -1;$$

where R3 represents a radius of curvature of the object side surface of the second lens, R4 represents a radius of curvature of the image side surface of the second lens, CT2 represents a center thickness of the second lens.

17. The camera module as claimed in claim 10, wherein the infrared optical imaging lens meets the expression:

$$4.97 \text{ mm} \leq T_L \leq 5.61 \text{ mm}.$$

18. A driver monitor system, comprising a memory, a processor, and a camera module, the memory and the camera module being electrically connected with the processor, the memory being configured to store image data, the processor being configured to process the image data, the camera module comprising an infrared optical imaging lens and an image sensor, the image sensor being opposite to the infrared optical imaging lens and configured to sense and generate the image data, the infrared optical imaging lens sequentially comprising:

a stop;
a first lens with a positive focal power, an object side surface of the first lens being convex, an image side surface of the first lens being concave;
a second lens with a positive focal power, an object side surface of the second lens being concave, an image side surface of the second lens being convex;
a third lens with a negative focal power, a paraxial region of an object side surface of the third lens being convex, a paraxial region of an image side surface of the third lens being concave; and
a filter;

wherein the first lens is a glass lens, the second lens and the third lens are both glass aspherical lenses, and optical centers of the first lens, the second lens and the third lens are positioned in a straight line;

wherein the infrared optical imaging lens meets the expressions:

$$3.0 \text{ mm} < f < 4.0 \text{ mm},$$

$$-3.0 \times 10^{-6}/°C. \leq (dn/dt)2 < -0.2 \times 10^{-6}/°C. \text{ and } 3.9 \times 10^{-6}/°C. \leq (dn/dt)2 < 8.5 \times 10^{-6}/°C.,$$

$$3.9 \times 10^{-6}/°C. \leq (dn/dt)3 < 8.5 \times 10^{-6}/°C.;$$

$$0.95 < \text{IH}/(f * \tan \theta) < 1.05; \text{ and}$$

$$1.393 \leq \varphi * T_L < 1.6;$$

where f represents a focal length of the infrared optical imaging lens, (dn/dt)2 represents a temperature coefficient of a refractive index of the second lens, and (dn/dt)3 represents a temperature coefficient of a refractive index of the third lens; IH represents a half image height of the infrared optical imaging lens, θ represents a half field of view of the infrared optical imaging lens, φ represents a focal power of the infrared optical imaging lens, and $T_L$ represents a total optical length of the infrared optical imaging lens from the object side surface of the first lens to an imaging plane;

wherein system performance of the infrared optical imaging lens before and after a reflow process with a highest ambient temperature of 230° C.-260° C. is consistent.

* * * * *